US011222047B2

(12) United States Patent
Pollak et al.

(10) Patent No.: US 11,222,047 B2
(45) Date of Patent: Jan. 11, 2022

(54) GENERATING DIGITAL VISUALIZATIONS OF CLUSTERED DISTRIBUTION CONTACTS FOR SEGMENTATION IN ADAPTIVE DIGITAL CONTENT CAMPAIGNS

(71) Applicant: Adobe Inc., San Jose, CA (US)

(72) Inventors: Yali Pollak, Kfar Saba (IL); Alexander Gorohovski, Beer Sheva (IL); Yana Segal, Haifa (IL); David Myers, Tel Aviv (IL); Andrey Nikitin, Tel Aviv (IL)

(73) Assignee: ADOBE INC., San Jose, CA (US)

( * ) Notice: Subject to any disclaimer, the term of this patent is extended or adjusted under 35 U.S.C. 154(b) by 237 days.

(21) Appl. No.: 16/263,238

(22) Filed: Jan. 31, 2019

(65) Prior Publication Data

US 2020/0110764 A1 Apr. 9, 2020

Related U.S. Application Data

(60) Provisional application No. 62/742,824, filed on Oct. 8, 2018.

(51) Int. Cl.
*G06F 16/28* (2019.01)
*G06F 16/2455* (2019.01)
(Continued)

(52) U.S. Cl.
CPC ........ *G06F 16/287* (2019.01); *G06F 16/2455* (2019.01); *G06F 16/9024* (2019.01); *G06K 9/6223* (2013.01)

(58) Field of Classification Search
USPC ...................................................... 707/737
See application file for complete search history.

(56) References Cited

U.S. PATENT DOCUMENTS 6,862,574 B1 3/2005 Srikant et al.
7,188,092 B2 * 3/2007 Wentland ............. G06K 9/6253
706/48

(Continued)

OTHER PUBLICATIONS

"JUMP releases SIMILARITY, an audience clustering tool for video service providers," http://www.jumptvs.com/press-notes/jump-release-similarity-audience-clustering-tool-video-service-providers/, dated Jan. 8, 2018.

(Continued)

*Primary Examiner* — Cam Linh T Nguyen
(74) *Attorney, Agent, or Firm* — Keller Jolley Preece

(57) ABSTRACT

This disclosure relates to methods, non-transitory computer readable media, and systems that, upon identifying a set of distribution contacts, generate clusters of distribution contacts from a sampled subset of distribution contacts and assign remaining distribution contacts from the set to the generated clusters for visualization in a user interface. By clustering a representative sample of such distribution contacts, the disclosed methods, non-transitory computer readable media, and systems can quickly analyze and identify contact characteristics in clusters of distribution contacts, including common contact characteristics exhibited by a given cluster's contacts. The disclosed methods, non-transitory computer readable media, and systems can accordingly respond to user requests for a cluster analysis by expeditiously generating cluster visualizations identifying contact characteristics of clustered distribution contacts.

20 Claims, 16 Drawing Sheets

(51) Int. Cl.
G06F 16/901 (2019.01)
G06K 9/62 (2006.01)

(56) References Cited

U.S. PATENT DOCUMENTS

| | | | | |
|---|---|---|---|---|
| 8,341,396 | B1* | 12/2012 | Nick-Baustert | H04L 51/063 |
| | | | | 713/153 |
| 8,706,827 | B1* | 4/2014 | Noble | H04M 1/72547 |
| | | | | 709/206 |
| 8,719,191 | B2* | 5/2014 | Baughman | G06N 20/00 |
| | | | | 706/12 |
| 9,154,514 | B1* | 10/2015 | Prakash | H04L 51/12 |
| 9,256,862 | B2* | 2/2016 | Lai | G06Q 10/107 |
| 9,716,791 | B1* | 7/2017 | Moran | H04L 65/1076 |
| 9,928,435 | B2* | 3/2018 | El-Khamy | G08G 1/0175 |
| 10,157,218 | B2* | 12/2018 | Hausler | G06F 16/285 |
| 10,614,113 | B2* | 4/2020 | Peled | G06F 16/93 |
| 10,922,390 | B1* | 2/2021 | Zhou | G06F 21/31 |
| 2002/0194050 | A1 | 12/2002 | Nabe et al. | |
| 2004/0181525 | A1* | 9/2004 | Itzhak | G06F 16/3347 |
| 2005/0267872 | A1* | 12/2005 | Galai | G06F 16/35 |
| 2005/0289071 | A1* | 12/2005 | Goin | G06F 11/008 |
| | | | | 705/56 |
| 2008/0233582 | A1* | 9/2008 | Stoll | C12Q 1/6883 |
| | | | | 435/6.16 |
| 2009/0259669 | A1* | 10/2009 | Abbruzzi | G06F 16/2462 |
| 2010/0088255 | A1* | 4/2010 | Mann | G16B 30/00 |
| | | | | 706/12 |
| 2010/0146530 | A1 | 6/2010 | Bolyukh et al. | |
| 2012/0290950 | A1* | 11/2012 | Rapaport | H04N 21/8358 |
| | | | | 715/753 |
| 2013/0124462 | A1* | 5/2013 | Bryan | G06F 16/683 |
| | | | | 707/610 |
| 2014/0149878 | A1* | 5/2014 | Mischari | H04M 1/2747 |
| | | | | 715/739 |
| 2014/0173528 | A1* | 6/2014 | Meyer | H04M 1/27475 |
| | | | | 715/863 |
| 2015/0142521 | A1 | 5/2015 | Aydin et al. | |
| 2015/0220951 | A1* | 8/2015 | Kurapati | H04M 15/83 |
| | | | | 705/7.33 |
| 2016/0014151 | A1* | 1/2016 | Prakash | H04L 63/1483 |
| | | | | 726/22 |
| 2016/0364390 | A1* | 12/2016 | Zhang | G06F 16/48 |
| 2017/0262635 | A1* | 9/2017 | Strauss | G06F 21/10 |
| 2018/0053199 | A1* | 2/2018 | Mathis | G06F 16/285 |
| 2018/0218382 | A1* | 8/2018 | Ye | G06N 5/003 |

OTHER PUBLICATIONS

David Sculley, "Web-Scale K-Means Clustering," Proceedings of the 19th International Conference on World Wide Web 1177-1178 (2010).
Kimberly Coffee; "k-means Clustering for Customer Segmentation: A Practical Example," http://www.kimberlycoffey.com/blog/2016/8/k-means-clustering-for-customer-segmentation, dated Aug. 13, 2016.
"Cluster Analysis and Segmentation," http://inseaddataanalytics.github.io/INSEADAnalytics/CourseSessions/Sessions45/ClusterAnalysisReading.html, site visited on Feb. 23, 2019.
Yen-Chung Liu & Yen-Liang Chen; "Customer Clustering Based on Customer Purchasing Sequence Data," Yen-Chung Liu. Int. Journal of Engineering Research and Application www.ijera.com ISSN : 2248-9622, vol. 7, Issue 1, ( Part-1) Jan. 2017, pp. 49-58 http://www.ijera.com/papers/Vol7_issue1/Part-1/I0701014958.pdf.
"Customer Segmentation Part 1: K Means Clustering," https://www.business-science.io/business/2016/08/07/CustomerSegmentationPt1.html, dated Aug. 7, 2016.
Dr. Sankar Rajagopal; "Customer Data Clustering Using Data Mining Technique,"; International Journal of Database Management Systems ( IJDMS ) vol. 3, No. 4, Nov. 2011 https://arxiv.org/pdf/1112.2663.pdf.
Brian Borchers & Ashlie Ossege, "An Innovative Method of Customer Clustering," https://pdfs.semanticscholar.org/8b3d/c2bbb691ef849018c65be6b95732a0a76aa6.pdf [site visited Feb. 20, 2019].
Ritchie Ng; "Identifying Customer Segments (Unsupervised Learning)," https://www.ritchieng.com/machine-learning-project-customer-segments/ [site visited on Feb. 20, 2019].
Shuo-Fu (Michael) Chen; "Hierarchical Clustering of Wholesale Customers Data," https://rstudio-pubs-Static.s3.amazonaws.com/182567_affb56f809d04c7c878068c1c8ea25a2.html, dated May 18, 2016.
Pranab Ghosh; "Customer Segmentation Based on Online Behavior using ScikitLearn," https://pkghosh.wordpress.com/2016/07/30/customer-segmentation-based-on-online-behavior-using-scikitlearn/, dated Jul. 30, 2016.
Chen et al. "PurTreeClust: A Clustering Algorithm for Customer Segmentation from Massive Customer Transaction Data," IEEE Transacations on Knowledge and Data Engineering, vol. 30, No. 3, Mar. 2018; https://ieeexplore.ieee.org/document/8085387?reload=true.
Daniel Harris; "Evolve Your Customer Segmentation Methods With Clustering," https://www.softwareadvice.com/resources/evolve-customer-segmentation-with-clustering/[site visited Feb. 20, 2019].
Srikant M. Datar and Caitlin N. Bowler; "Chateau Winery (B): Supervised Learning," https://www.hbs.edu/faculty/Pages/item.aspx?num=53132; Aug. 2018.
Roung-Shiunn Wu, Po-Hsuan Chou; "Customer segmentation of multiple category data in e-commerce using a soft-clustering approach," ScienceDirect.com; Electronic Commerce Research and Applications vol. 10, Issue 3, May-Jun. 2011, pp. 331-341; https://www.sciencedirect.com/science/article/pii/S1567422310000888.
Jonathan Sedar; "Customer Clustering for Retailer Marketing; An Exploratory Data Science Project with Reference to Useful R Packages," https://www.slideshare.net/jonsedar/customer-clustering-for-marketing, dated Mar. 12, 2014.
TowardsDataScience.com; Outlier AI; "How to cluster your customer data—with R code examples," https://towardsdatascience.com/how-to-cluster-your-customer-data-with-r-code-examples-6c7e4aa6c5b1, dated Jun. 13, 2017.

* cited by examiner

GENERATING DIGITAL VISUALIZATIONS OF CLUSTERED DISTRIBUTION CONTACTS FOR SEGMENTATION IN ADAPTIVE DIGITAL CONTENT CAMPAIGNS

CROSS-REFERENCE TO RELATED APPLICATIONS

This application claims the benefit of and priority to U.S. Provisional Patent Application No. 62/742,824, filed Oct. 8, 2018, the entire contents of which are hereby incorporated by reference.

BACKGROUND

Software developers and engineers have devised existing distribution-analytics systems to analyze, group, and visualize distribution contacts. In some cases, distribution-analytics systems can identify features of a group of distribution contacts, including individuals or organizations corresponding to digital contact addresses. But current distribution-analytics systems have computing limitations that overly tax computing resources, prolong analysis of distribution contacts, and limit the visualization of various distribution contacts.

For example, some conventional distribution-analytics systems inefficiently consume processor and other computing resources to identify features of individual distribution contacts or distribution-contact groups from relatively large databases. Upon receiving a request to analyze a group of distribution contacts, some systems laboriously analyze the features of each contact within a group of distribution contacts. Such one-by-one analysis can expend considerable processing, memory, or other computing resources when the group includes distribution contacts in the tens of thousands, millions, or billions. Because of such resource-intensive computing, a conventional distribution-analytics system sometimes expends considerable time to analyze (and generate visualizations for) a group of distribution contacts.

In addition to inefficient computing, in some cases, conventional distribution-analytics systems visualize features of distribution contacts using isolated and inflexible user interfaces. For instance, some conventional distribution-analytics systems generate contact entries for individual distribution contacts that include fields identifying contact features. Such line-entry representation of contacts often requires analysts to scroll through countless screens of entries—or to sort contacts by features in a spreadsheet—in cumbersome user-interface layouts. These layouts result in excessive navigation among multiple user interfaces.

In an improvement to individual-entry representations, some conventional distribution-analytics systems digitally visualize a group of distribution contacts in charts or other graphical representations with a breakdown of individual features of the group, such as graphical breakdowns by percentage of distribution contacts corresponding to individual contact features. But such feature breakdowns often isolate features by category and inhibit graphical user interfaces from facilitating a comparison of distribution contacts across different feature categories.

SUMMARY

This disclosure describes one or more embodiments of methods, non-transitory computer readable media, and systems that solve the foregoing problems in addition to providing other benefits. In particular, the disclosed systems can efficiently generate digital visualizations that portray large monolithic digital contact audiences in coherent clusters, provide digital visualizations that illustrate the common properties of each cluster, and distribute individualized digital content across computer networks to computing devices corresponding to the digital contacts in each cluster. For example, upon identifying a set of distribution contacts, the disclosed systems can generate clusters of distribution contacts from a sampled subset of distribution contacts. The disclosed systems can then assign remaining distribution contacts from the set to the generated clusters for visualization in a user interface. By clustering a representative sample of distribution contacts, the disclosed systems can quickly analyze and identify contact characteristics in clusters of distribution contacts, including common contact characteristics exhibited by contacts within a given cluster. The disclosed systems can accordingly respond to user requests for a cluster analysis (and distribute digital content via the distribution contacts in each cluster) by expeditiously generating cluster visualizations that identify contact characteristics of clustered distribution contacts.

In some embodiments, for instance, the disclosed systems sample a subset of distribution contacts and a corresponding subset of contact characteristics from a distribution dataset comprising a set of distribution contacts. From the subset of distribution contacts, the disclosed systems generate clusters of distribution contacts based on a clustering algorithm and the subset of contact characteristics. Having generated clusters, the disclosed systems assign remaining distribution contacts from the set of distribution contacts to the clusters of distribution contacts based on contact characteristics of the remaining distribution contacts. The disclosed systems further identify a common contact characteristic in a given cluster of distribution contacts and provide the given cluster and its common contact characteristic for display in a graphical user interface.

BRIEF DESCRIPTION OF THE DRAWINGS

The detailed description refers to the drawings briefly described below.

DETAILED DESCRIPTION

Figure 1:
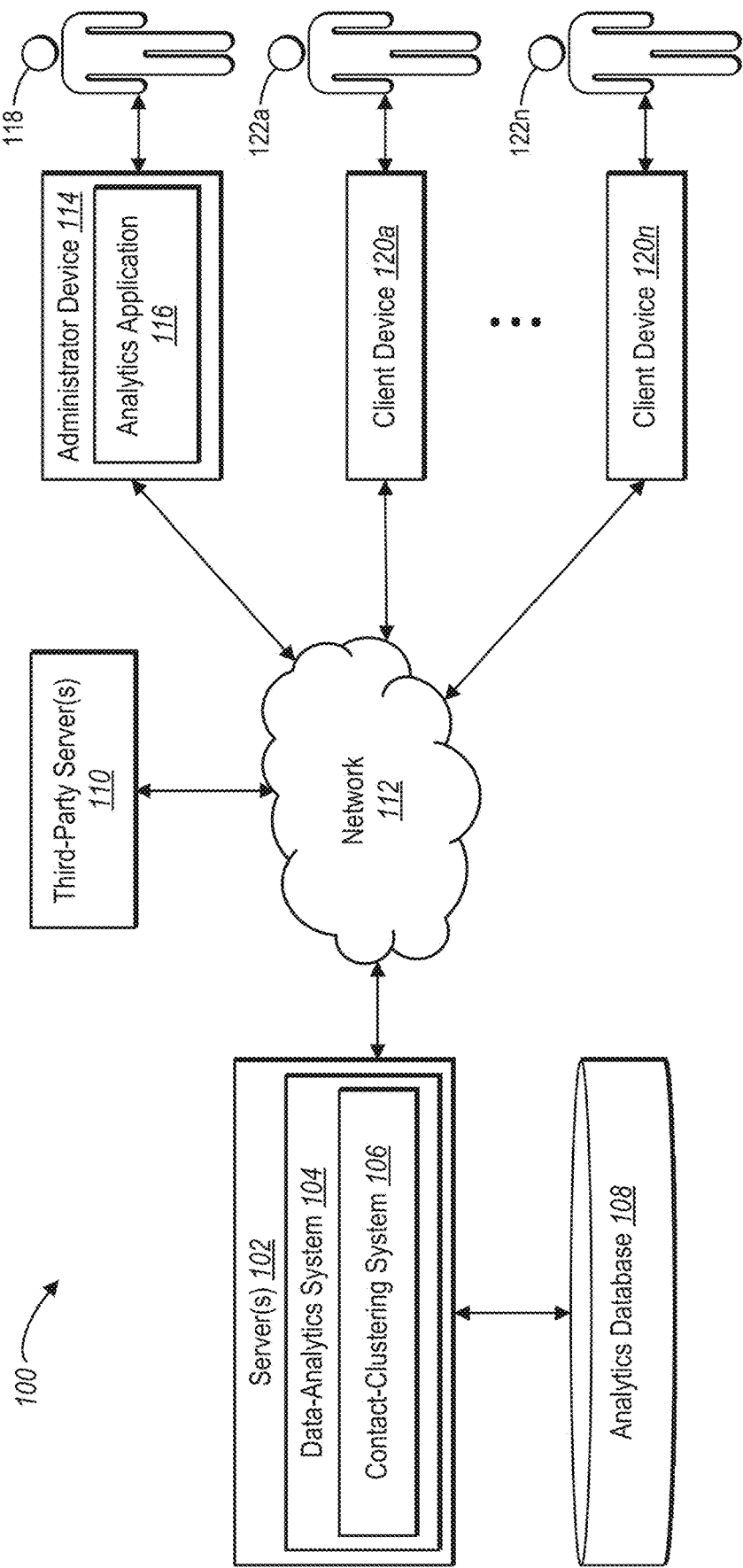
FIG. 1 illustrates a block diagram of an environment in which a data-analytics system and a contact-clustering system can operate in accordance with one or more embodiments.

This disclosure describes one or more embodiments of a contact-clustering system that efficiently splits distribution contacts into granular, coherent clusters and visualizes the common properties of each cluster for efficient selection and distribution of individualized digital content to the distribution contacts within each cluster. For example, upon identifying a set of distribution contacts selected by a user, the contact-clustering system can apply a clustering algorithm to a sampled subset of distribution contacts and corresponding contact characteristics (e.g., a statistically significant representative sample) to generate clusters of distribution contacts for visualization in a user interface. The contact-clustering system can further assign remaining distribution contacts from the set of distribution contacts to the generated clusters according to the remaining distribution contacts' contact characteristics. By clustering a representative sample of distribution contacts, the contact-clustering system expedites identifying and visualizing contact characteristics from clusters of distribution contacts. By both applying a clustering algorithm to a subset and assigning remaining distribution contacts to clusters, the contact-clustering system can quickly generate cluster visualizations that identify common (and other) contact characteristics of a given cluster of distribution contacts and facilitate a comparison of contact characteristics across clusters.

In some embodiments, for instance, the contact-clustering system identifies user input from a client device requesting a cluster analysis of a set of distribution contacts. Upon receiving the request, the contact-clustering system samples a subset of distribution contacts and a corresponding subset of contact characteristics from a distribution dataset comprising the set of distribution contacts. From the subset of distribution contacts, the contact-clustering system generates clusters of distribution contacts based on a clustering algorithm and the subset of contact characteristics. Having generated the clusters, the contact-clustering system assigns remaining distribution contacts from the set of distribution contacts to the clusters of distribution contacts based on contact characteristics of the remaining distribution contacts. The contact-clustering system further identifies a common contact characteristic in a given cluster of distribution contacts and provides the given cluster and its common contact characteristic for display in a clustering user interface of the client device.

As just mentioned, the contact-clustering system can identify (e.g., receive) a request for a cluster analysis of a set of distribution contacts. In particular, the contact-clustering system may identify a request for a cluster analysis of different sets of distribution contacts and/or contact-characteristic categories. In some cases, for example, the cluster-analysis request identifies a particular set of distribution contacts and particular contact-characteristic categories for the set of distribution contacts. Such contact-characteristic categories may include, for example, click-through rate, company, country, or distribution-contact score for a distribution contact, among other contact characteristics.

Based on receiving a cluster-analysis request, the contact-clustering system can generate and visualize clusters of distribution contacts. In particular, the contact-clustering system can generate clusters from distribution contacts and contact-characteristic categories identified in the request. Such clusters can include (i) distribution contacts sampled from a set of distribution contacts by the contact-clustering system and grouped by clustering algorithm and (ii) remaining distribution contacts from the set of distribution contacts assigned by the contact-clustering system.

As noted above, in some embodiments, the contact-clustering system identifies a common contact characteristic in a given cluster of distribution contacts. In certain implementations, the contact-clustering system applies a commonality threshold for determining common contact characteristics. For example, the contact-clustering system can compute a distribution of a contact characteristic within both an individual cluster of distribution contacts and a larger set of distribution contacts. When the difference between each distribution satisfies a commonality threshold, the contact-clustering system can identify the contact characteristic as a common contact characteristic in a given cluster of distribution contacts.

As mentioned, the contact-clustering system can also visualize common contact characteristics (and other contact characteristics) of a cluster in a graphical user interface. For instance, in some embodiments, the contact-clustering system generates a cluster visualization for various contact characteristics of a cluster of distribution contacts. Such a cluster visualization may include, for example, visual indicators for a quantity of distribution contacts in a cluster and common contact characteristics corresponding to the quantity of distribution contacts. Similarly, cluster visualizations can include other contact characteristics, such as contact characteristics selected by a user for a cluster analysis.

As suggested above, the contact-clustering system can further distribute individualized digital content to different clusters of distribution contacts (e.g., as part of one or more digital content campaigns). For example, upon receiving an indication of user selection of a cluster of distribution contacts the contact-clustering system can send an electronic message, image, or other digital content to computing devices for the selected cluster of distribution contacts. The contact-clustering system accordingly facilitates distributing selected digital content to clusters of distribution contacts having particular common contact characteristics.

As suggested above, the contact-clustering system improves and overcomes several technical deficiencies that hinder conventional distribution-analytics systems. For instance, the contact-clustering system improves computing efficiency relative to conventional systems. Unlike the contact-by-contact analysis of characteristics by conventional distribution-analytics systems, the contact-clustering system applies a clustering algorithm to a sampled subset of distribution contacts, such as a Mini-Batch-K-Means-clustering algorithm. The contact-clustering system's sampling can replace a prolonged analysis of thousands to billions of distribution contacts (and corresponding contact characteristics) by selectively applying a clustering algorithm to a representative subset of distribution contacts. By both applying a clustering algorithm to a subset and assigning remaining distribution contacts to clusters, in some embodiments, the contact-clustering system executes an ordered algorithm that is scalable to any number of distribution contacts and expedites clustering an entire set of distribution contacts into clusters.

In addition to improved computing efficiency, the contact-clustering system improves the efficiency of conventional graphical user interfaces by reducing the user-interface navigation to view different aspects of clusters of distributions in cluster visualizations (e.g., reducing the number of user interactions and user interfaces). By generating a clustering user interface with cluster visualizations indicating a cluster's common contact characteristics, the contact-clustering system eliminates inefficient screen-by-screen scrolling or manual sorting and integrates contact-characteristic analysis into a single cluster visualization. Unlike conventional user interfaces with line-entry representation of contacts, the contact-clustering system can accordingly generate user interfaces with cluster visualizations that integrate common contact characteristics with representations of a cluster of distribution contacts.

Beyond improved user interaction and navigation, the contact-clustering system improves the flexibility with which a user interface for a distribution-analytics system facilitates comparison of contact characteristics across (or within) clusters of distribution contacts. As noted above, in some embodiments, the contact-clustering system can generate a clustering user interface comprising a cluster visualization identifying a common contact characteristic of a cluster of distribution contacts. Unlike conventional user interfaces that limit charts or graphs to a breakdown of individual contact characteristics, the contact-clustering system provides a snapshot of a cluster's common contact characteristics in comparison to other clusters or to a larger set of distribution contacts. Such a cluster visualization quickly surfaces contact characteristics of a cluster of distribution contacts that conventional user interfaces may bury in multiple user interfaces.

As indicated by the foregoing description, this disclosure uses a variety of terms to describe features and advantages of the contact-clustering system. As used in this disclosure, the term "distribution contact" refers to digital contact information corresponding to an individual or entity, such as an email address or identifier, a phone number, a social-media handle or identifier, or a webpage or website (or to an individual or entity corresponding to such digital contact information). In particular, in some embodiments, a distribution contact includes digital contact information for a person or an organization (or a person or organization corresponding to such digital contact information) that has expressed interest in a product or service.

Relatedly, the term "contact characteristic" refers to a particular digital action, classification, quality, or trait of a distribution contact. In some embodiments, for instance, a contact characteristic refers to an action performed by a network user or client device via a network, a trait of a network user or other digital entity, or a classification of a network user or other digital entity identified or recorded in a database. A contact characteristic may be, but is not limited to, a particular descriptor, identifier, or value for at least one of the following: an age or age range, an amount of currency (e.g., an amount of one or more purchases), a click-through rate, a company, a company size (e.g., number of employees), a country, a distribution-contact score, a gender, a geographic location for a distribution contact or client device, an industry, a job title, a job function, a language of a distribution contact, a maturity, an open rate, revenue, a state, a subscription to a digital service, or a webpage or website visited by a user.

As used herein, a "click-through rate" indicates a number of electronic messages (e.g., emails, texts) clicked on by a distribution contact (e.g., the number of clicks divided by a number of electronic messages sent to a distribution contact). A "distribution-contact score" refers to a score indicating a level of worth (e.g., interest or value) in distributing digital content to a distribution contact. To determine a distribution-contact score, in some embodiments, a data-analytics system determines the worthiness of distribution contacts by attaching values to such contacts based on their behavior relating to their interest in products or services. The conctact-clustering system can determine a distribution-contact score in a variety of ways, such as by assigning points, by implementing rankings such as A, B, C, or D, or by using terms such as "hot," "warm," or "cold." Regardless of the method implemented, the contact-clustering system can incorporate a combination of demographic attributes; lead source and offer; budget, authority, need, and timeline (BANT) considerations; completeness of data profile; and behavioral attributes in determining a distribution-contact score.

An "open rate" refers to a rate of electronic messages that the distribution contact has opened (e.g., the number of opened electronic messages divided by a number of electronic messages sent to the distribution contact).

As also used herein, the term "common contact characteristic" refers to a contact characteristic shared by (or corresponding to) multiple distribution contacts within a cluster of distribution contacts. As explained below, in some embodiments, a common contact characteristic refers to a contact characteristic that corresponds to a distribution, number, or percentage of distribution contacts within a cluster of distribution contacts and that satisfies a commonality threshold.

The term "contact-characteristic category" refers to a class, dimension, or category for a contact characteristic. While a contact-characteristic category describes a broader class of contact characteristics, a contact characteristic may be a particular description, identifier, or value within the broader contact-characteristic category. For example, a contact-characteristic category of "company" may include a descriptor of "Adobe Inc." or other company names corresponding to a distribution contact.

As noted above, the contact-clustering system generates clusters of distribution contacts. The term "cluster" refers to a grouping of multiple distribution contacts. In some embodiments, a cluster includes a grouping of distribution contacts that share one or more contact characteristics. For example, a given cluster of distribution contacts may include a particular number or percentage of distribution contacts that correspond to a particular company, industry, state, or other contact characteristic.

Finally, the term "visualization" refers to a graphical representation of a dataset generated by a computing device. In particular, in some embodiments, a cluster visualization refers to a graphical representation of a cluster of distribution contacts and one or more contact characteristics of the cluster within a graphical user interface. For example, a cluster visualization may include, but is not limited to, a graphical representation of a contact characteristic in a gauge, graph, or table.

Turning now to FIG. 1, this figure depicts a block diagram illustrating an exemplary system environment ("environment") 100 in which a contact-clustering system 106 can operate in accordance with one or more embodiments. Specifically, FIG. 1 illustrates the environment 100 comprising server(s) 102, third-party server(s) 110, a network 112, an administrator device 114, an administrator 118 associated with the administrator device 114, client devices 120a-120n, and distribution contacts 122a-122n associated with the client devices 120a-122n. Although FIG. 1 illustrates one administrator device and one administrator—and two client devices and two distribution contacts—the environment 100 can alternatively include any number of computing devices and associated administrators or distribution contacts. Similarly, although FIG. 1 illustrates a particular arrangement of the server(s) 102, the third-party server(s) 110, the network 112, the administrator device 114, and the client devices 120a-120n, various additional arrangements are possible.

As shown in FIG. 1, the server(s) 102, the third-party server(s) 110, the network 112, the administrator device 114, and the client devices 120a-120n may be communicatively coupled with each other either directly or indirectly, such as coupling through the network 112, which is described further below in relation to FIG. 8. The server(s) 102, the administrator device 114, and the client devices 120a-120n may include any type of computing device, including one or more computing devices as discussed further below in relation to FIG. 8.

As depicted in FIG. 1, the server(s) 102 can generate, store, receive, and/or transmit any type of data, including requests for cluster analyses or datasets underlying visualizations of clusters of distribution contacts. For example, the server(s) 102 can receive a request for a cluster analysis of a set of distribution contacts from the administrator device 114. The server(s) 102 can further transmit data packets that, upon receipt, cause the administrator device 114 to present a cluster visualization of a cluster of distribution contacts and a common contact characteristic of the cluster within a graphical user interface. In some embodiments, the server(s) 102 comprise a data server, a communication server, or a web-hosting server.

As further shown in FIG. 1, the server(s) 102 can include a data-analytics system 104. The data-analytics system 104 can perform various digital-analytics functions or digital-campaign functions. For example, in some embodiments, the data-analytics system 104 uses the server(s) 102 to collect data corresponding to events and contact characteristics from the client devices 120a-120n (e.g., by collecting data tracking application uses, orders, purchases, or webpage views). The data-analytics system 104 may collect such datasets to determine or identify contact characteristics of the distribution contacts 122a-122n. Relatedly, in some cases, the third-party server(s) 110 or the data-analytics system 104 via the server(s) 102 track actions performed; files accessed, downloaded, or purchased; products or services downloaded or used; or transactions made by the client devices 120a-120n in connection with the server(s) 102 or the third-party server(s) 110.

In addition to the data-analytics system 104, the server(s) 102 can include the contact-clustering system 106. The contact-clustering system 106 (or the data-analytics system 104) can use the server(s) 102 to request from the third-party server(s) 110 (or retrieve from an analytics database 108) datasets corresponding to distribution contacts to store in the analytics database 108, such as datasets representing actions, files, information, products or services, transactions, or web sites related to particular distribution contacts.

The contact-clustering system 106 can further use the server(s) 102 to sample a subset of distribution contacts and a corresponding subset of contact characteristics from the analytics database 108. From the subset of distribution contacts, in certain implementations, the contact-clustering system 106 further uses the server(s) 102 to (i) generate clusters of distribution contacts based on a clustering algorithm and the subset of contact characteristics, (ii) assign remaining distribution contacts from the set of distribution contacts to the clusters of distribution contacts based on contact characteristics of the remaining distribution contacts, and (iii) identify a common contact characteristic in a given cluster of distribution contacts. Based on a cluster-analysis request, the contact-clustering system 106 can subsequently use the server(s) 102 to provide the given cluster and its common contact characteristic for display in a user interface of the administrator device 114.

In addition to providing visualizations of a given cluster and common contact characteristics, in some embodiments, the contact-clustering system 106 receives, from the administrator device 114 via the server(s) 102, an indication of a selection by the administrator 118 of a cluster of distribution contacts. Based on the indication of such a selection, the contact-clustering system 106 can distribute digital content to some (or all) of the client devices 120a-120n corresponding to distribution contacts from the selected cluster of distribution contacts.

As illustrated by previous embodiments, the contact-clustering system 106 can be implemented in whole or in part by the individual elements of the environment 100. Although FIG. 1 illustrates the contact-clustering system 106 implemented within the server(s) 102, components of the contact-clustering system 106 can be implemented in any of the components of the environment 100. For instance, in some embodiments, the administrator device 114 comprises the contact-clustering system 106 and performs all of the functions, methods, and processes of the contact-clustering system 106 described above and below. This disclosure describes the components of the contact-clustering system 106 further below with regard to FIG. 6.

As further shown in FIG. 1, in some embodiments, the administrator device 114 comprises a computing device that enables the administrator 118 to send and receive digital communications. For example, the administrator device 114 can include a desktop computer, laptop computer, smartphone, tablet, or other electronic device. In some embodiments, the administrator device 114 further includes one or more software applications (e.g., an analytics application 116) that enables the administrator 118 to send and receive digital communications. For example, the analytics application 116 can be a software application installed on the administrator device 114 or a software application hosted on the server(s) 102. When hosted on the server(s) 102, the analytics application 116 may be accessed by the administrator device 114 through another application, such as a web browser.

In some implementations, the analytics application 116 includes instructions that, when executed by a processor, cause the administrator device 114 to present one or more graphical user interfaces, such as various user interfaces comprising representations of clusters of distribution contacts described below. For example, in certain embodiments, the analytics application 116 includes instructions that, when executed by a processor, cause the administrator device 114 to present graphical user interfaces comprising options, fields, or other input variations for the administrator 118 to define digital-content-campaign parameters. The administrator device 114 can provide digital-content-campaign parameters and digital content to the server(s) 102. More-over, the server(s) 102 can execute one or more digital content campaigns (according the digital-content-campaign parameters) and distribute digital content corresponding to the one or more digital content campaigns to some (or all) of the client devices 120a-120n.

As also illustrated in FIG. 1, the data-analytics system 104 is communicatively coupled to the analytics database 108. Among other things, the analytics database 108 includes a record of distribution contacts and contact characteristics corresponding to individual distribution contacts. In one or more embodiments, the data-analytics system 104 accesses and queries data from the analytics database 108 associated with requests from the contact-clustering system 106. For instance, the data-analytics system 104 may access datasets corresponding to distribution contacts and contact characteristics for the contact-clustering system 106. As shown in FIG. 1, the analytics database 108 is separately maintained from the server(s) 102. Alternatively, in one or more embodiments, the data-analytics system 104 and the analytics database 108 comprise a single combined system or subsystem within the server(s) 102.

Figure 2:
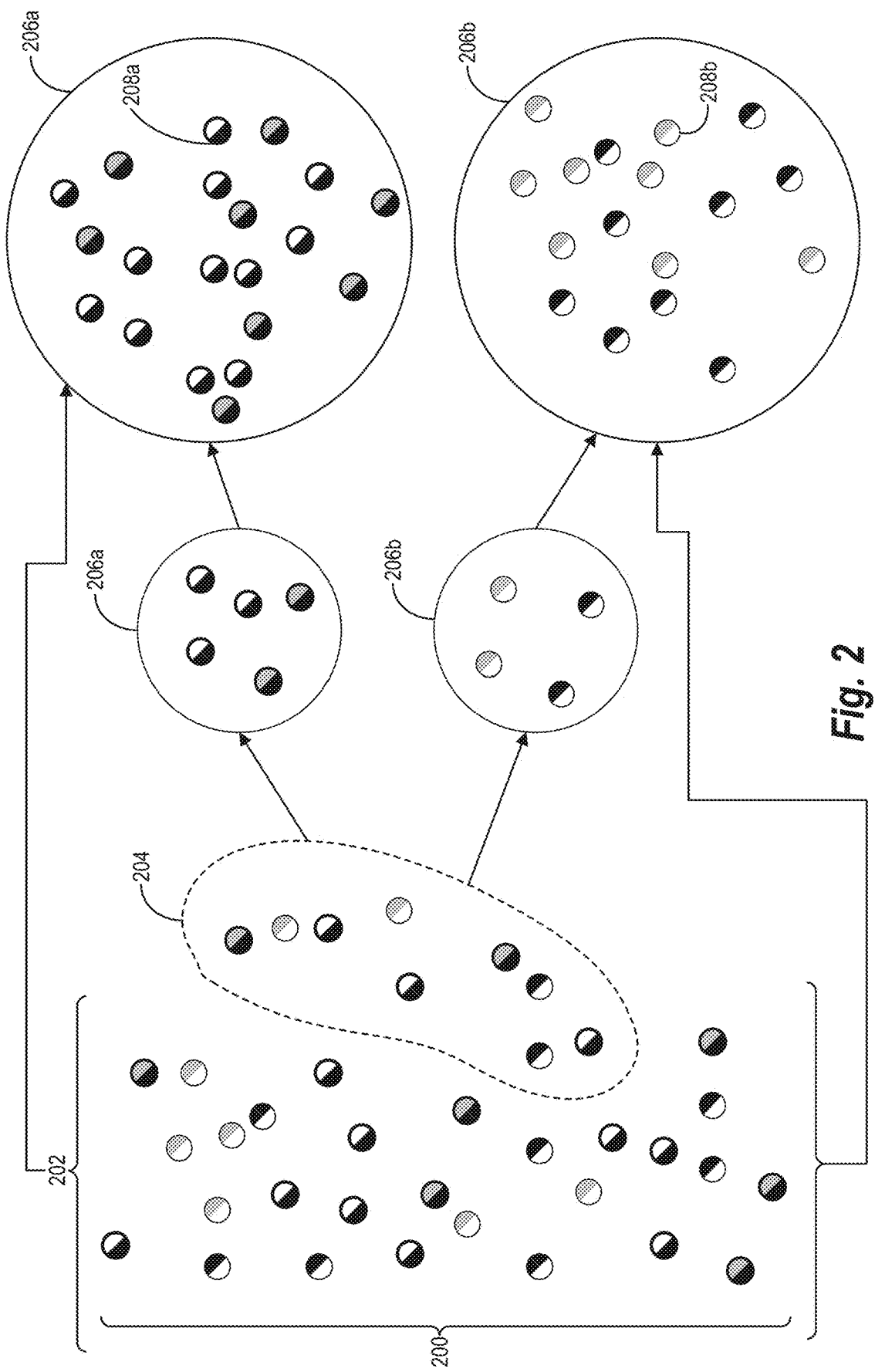
FIG. 2 illustrates the contact-clustering system generating clusters of distribution contacts and identifying a common contact characteristic in the clusters in accordance with one or more embodiments.

FIG. 2 illustrates an overview of an embodiment of the contact-clustering system 106 generating clusters of distribution contacts and identifying common contact characteristics in the clusters in accordance with one or more embodiments. As suggested by FIG. 2, the contact-clustering system 106 identifies a request for a cluster analysis of a set of distribution contacts 200. Based on the cluster-analysis request, the contact-clustering system 106 identifies the set of distribution contacts 200 and corresponding contact characteristics. For simplicity and illustrative purposes, FIG. 2 visually represents various contact characteristics with various shadings of the border and contents of circles representing distribution contacts. In some embodiments, however, the contact-clustering system 106 stores distribution contacts and each corresponding contact characteristics as datasets in a database.

As shown in FIG. 2, the contact-clustering system 106 samples a subset of distribution contacts 204 and a corresponding subset of contact characteristics from the set of distribution contacts 200. The contact-clustering system 106 further applies a clustering algorithm to the subset of distribution contacts 204 and the corresponding subset of contact characteristics to generate clusters of distribution contacts 206a and 206b. As indicated in FIG. 2, the contact-clustering system 106 generates the clusters of distribution contacts 206a and 206b based on the subset of contact characteristic corresponding to the subset of distribution contacts 204.

Having generated clusters, the contact-clustering system 106 assigns remaining distribution contacts 202 from the set of distribution contacts 200 to one of the clusters of distribution contacts 206a and 206b. To assign the remaining distribution contacts 202, in some embodiments, the contact-clustering system 106 maps the contact characteristics of the remaining distribution contacts 202 to contact characteristics of a representative distribution contact for one of the clusters of distribution contacts 206a and 206b. Upon the contact-clustering system 106 assigning the remaining distribution contacts 202, both of the clusters of distribution contacts 206a and 206b include additional distribution contacts from the set of distribution contacts 200.

As further shown in FIG. 2, in some embodiments, the contact-clustering system 106 identifies a common contact characteristic in the clusters of distribution contacts 206a and 206b, respectively. For illustrative purposes, FIG. 2 identifies a common contact characteristic 208a from the cluster of distribution contacts 206a and a common contact characteristic 208b from the cluster of distribution contacts 206b. Based on the cluster-analysis request, in certain implementations, the contact-clustering system 106 provides for display in a graphical user interface of an administrator device (i) a cluster visualization of the cluster of distribution contacts 206a and the common contact characteristic 208a and (ii) a cluster visualization of the cluster of distribution contacts 206b and the common contact characteristic 208b.

Figure 3A:
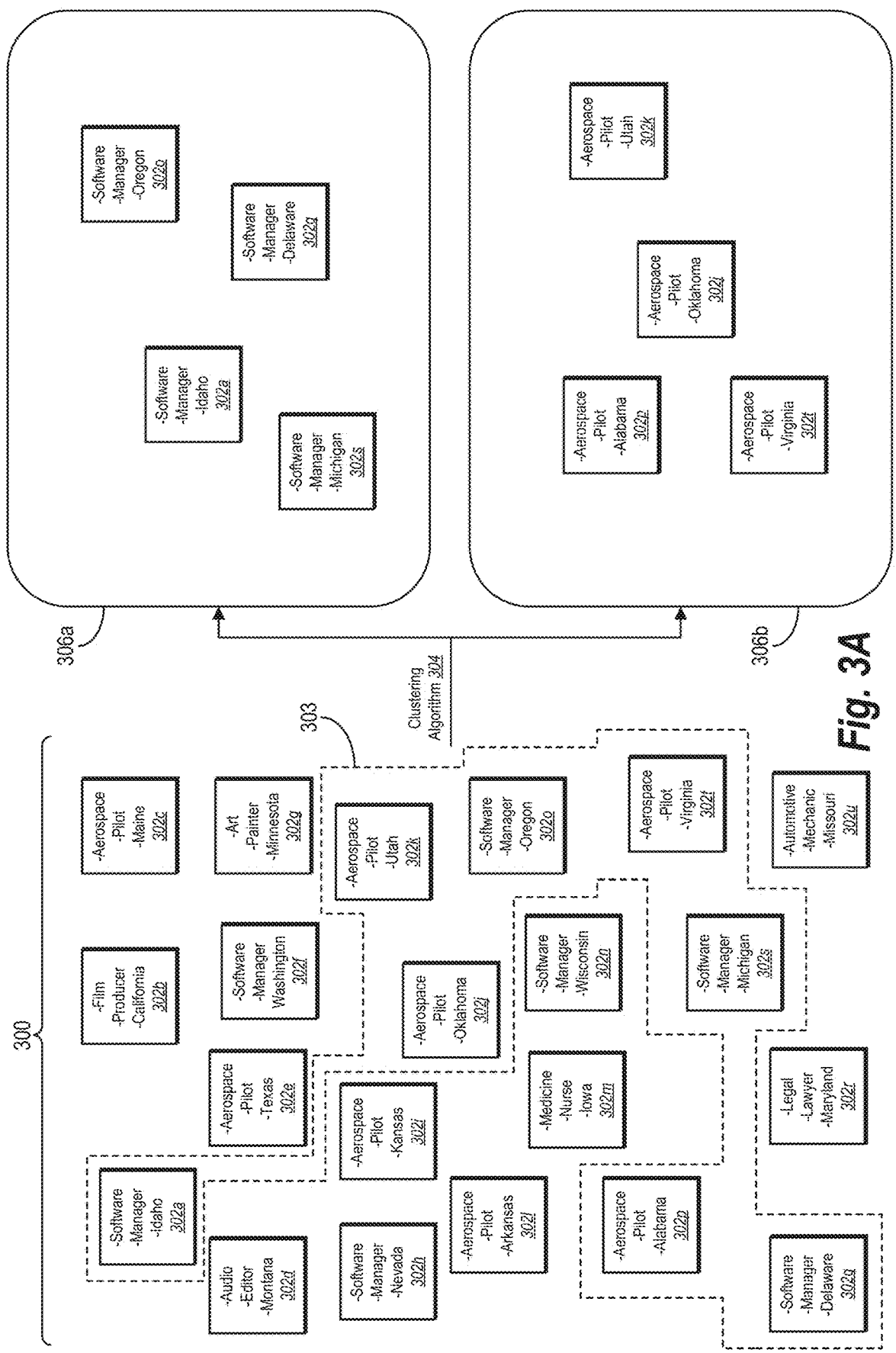
FIG. 3A illustrates the contact-clustering system sampling a subset of distribution contacts and generating clusters of distribution contacts from the subset in accordance with one or more embodiments.
Figure 3B:
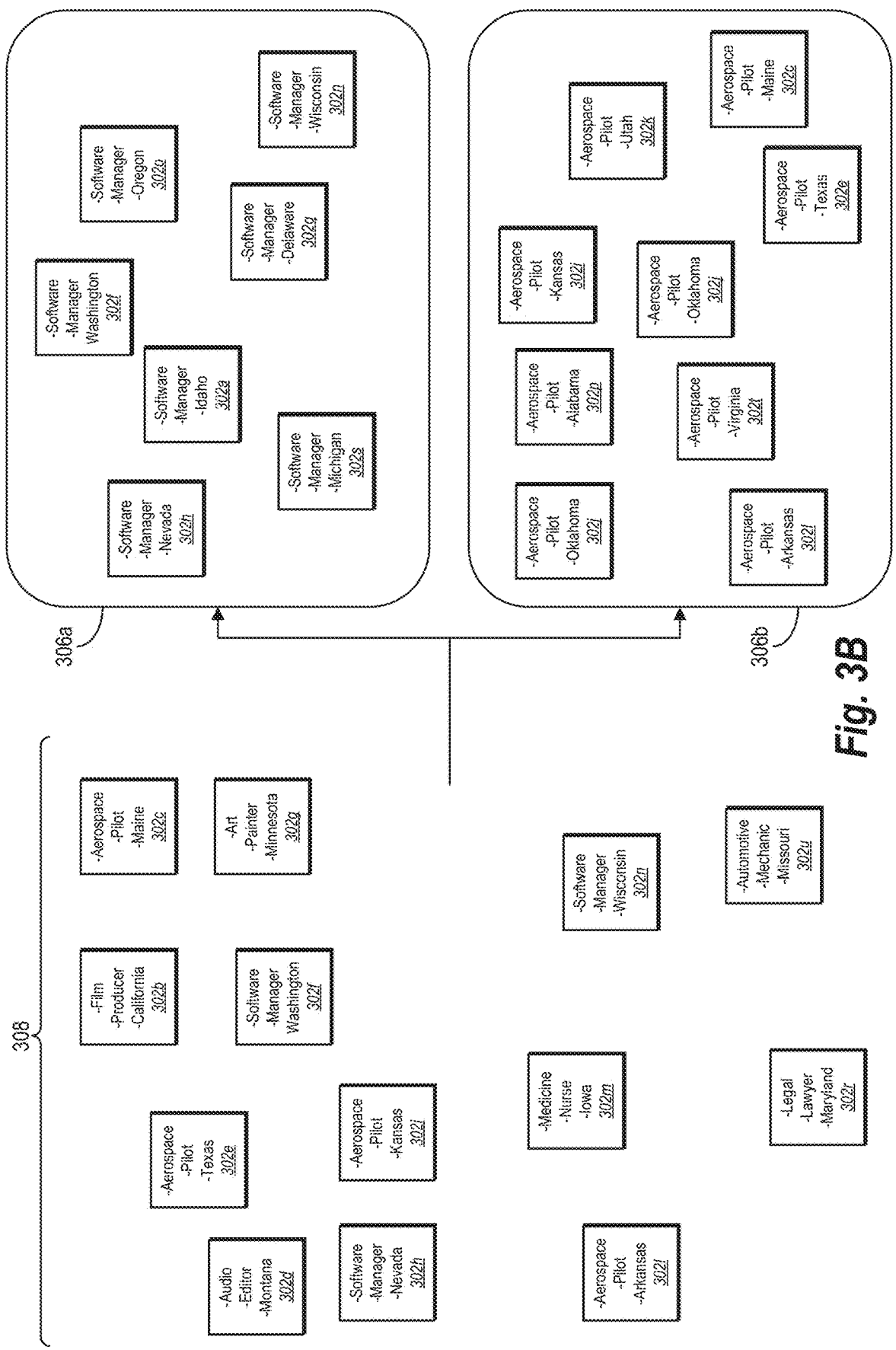
FIG. 3B illustrates the contact-clustering system assigning remaining distribution contacts from a set of distribution contacts to clusters of distribution contacts in accordance with one or more embodiments.
Figure 3C:
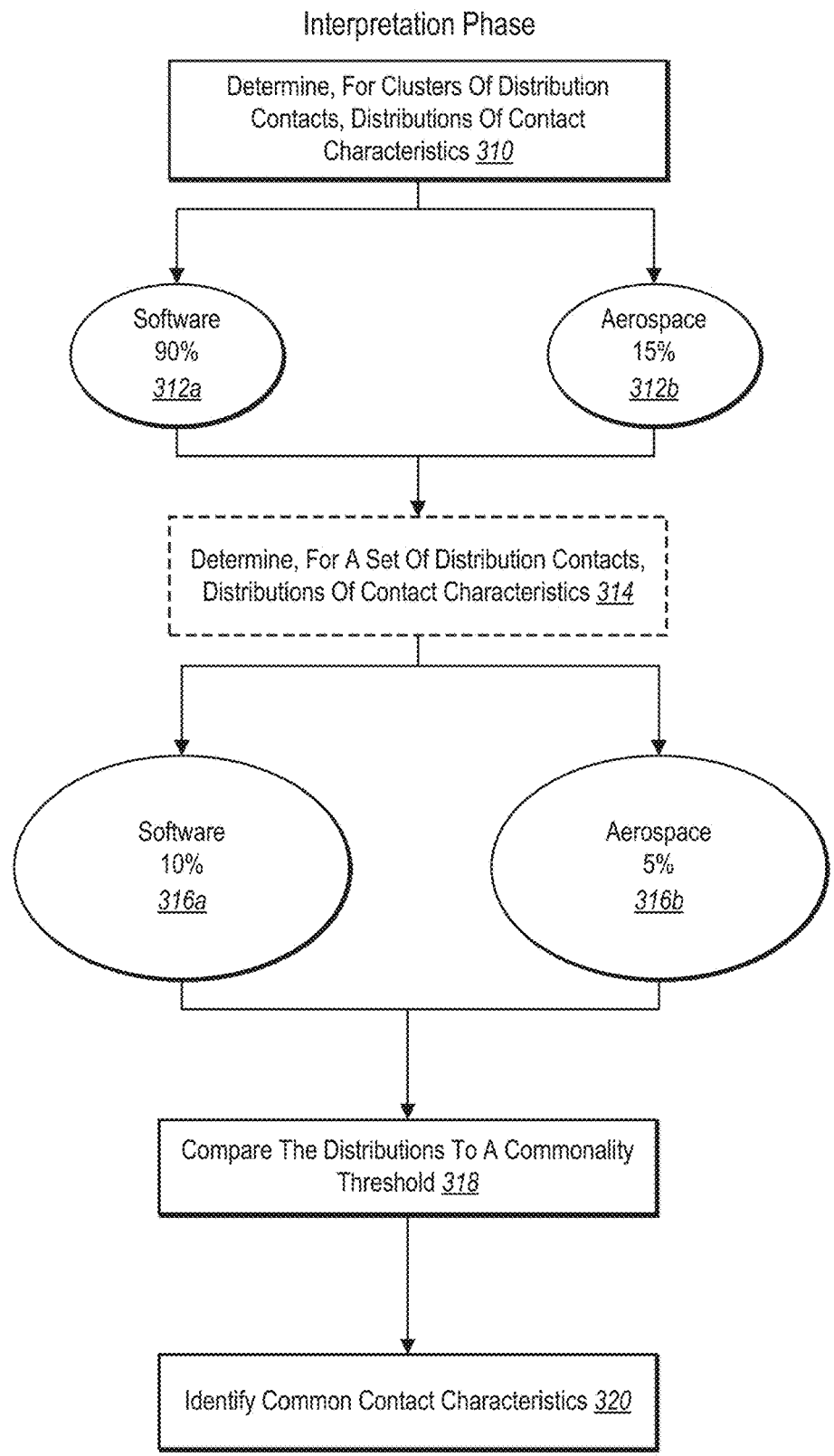
FIG. 3C illustrates the contact-clustering system identifying common contact characteristics in clusters of distribution contacts in accordance with one or more embodiments in accordance with one or more embodiments.

FIGS. 3A-3C illustrate additional details regarding the contact-clustering system 106 generating clusters of digital contacts in accordance with one or more embodiments. As an overview, FIG. 3A depicts the contact-clustering system 106 sampling a subset of distribution contacts from a set of distribution contacts and generating clusters of distribution contacts from the subset of distribution contacts. FIG. 3B depicts the contact-clustering system 106 assigning remaining distribution contacts from the set of distribution contacts to the clusters of distribution contacts. FIG. 3C depicts the contact-clustering system 106 identifying common contact characteristics in clusters of distribution contacts.

As shown in FIG. 3A, for example, the contact-clustering system 106 identifies a set of distribution contacts 300 based on a cluster-analysis request. For illustrative purposes, FIG. 3A depicts the set of distribution contacts 300 as including distribution contacts 302a-302u. However, the set of distribution contacts 300 may include many more distribution contacts not shown in FIG. 3A. As indicated by FIG. 3A, each of the distribution contacts 302a-302u correspond to various contact characteristics. For example, in some embodiments, each of the distribution contacts 302a-302u correspond to a contact characteristic for the contact-characteristic categories of industry, job title, and state. That said, many other contact characteristics and contact-characteristic categories could be used. In some cases, the contact-clustering system 106 retrieves the set of distribution contacts 300 from a distribution database, where each distribution contact is stored as a single line of data with its respective contact characteristics.

After identifying the set of distribution contacts 302a-302u, the contact-clustering system 106 samples a subset of distribution contacts and a corresponding subset of contact characteristics from the set of distribution contacts 300. For example, in some embodiments, the contact-clustering system 106 applies a sampling algorithm to the set of distribution contacts 300 to identify a subset of distribution contacts as a representative sample from the set of distribution contacts 300. In some such cases, the contact-clustering system 106 applies a simple-random-sampling ("SRS") algorithm, a simple-random-sampling-with-replacement ("SRSWR") algorithm, a Bernoulli-sampling algorithm, or a Poisson-sampling algorithm. Independent of the sampling algorithm used, the contact-clustering system 106 can apply any suitable sampling algorithm to sample a subset of distribution contacts of sufficient size comprising contact characteristics representing the set of distribution contacts 300 to a statistical significance. The contact-clustering system 106 can, for instance, sample a subset of distribution contacts and corresponding contact characteristics constituting a representative sample from the set of distribution contacts 300 to a statistical significance (e.g., 99.5% significance based on statistical significance testing).

For illustrative purposes in FIG. 3A, the contact-clustering system 106 samples a subset of distribution contacts 303 comprising distribution contacts 302a, 302j, 302k, 302n, 302o, 302q, 302s, and 302t. Collectively, the distribution contacts 302a, 302j, 302k, 302n, 302o, 302q, 302s, and 302t correspond to contact characteristics representative of the contact characteristics in the set of distribution contacts 300.

Having sampled the subset of distribution contacts 303, the contact-clustering system 106 applies a clustering algorithm 304 to the subset of distribution contacts 303 and corresponding subset of contact characteristics. In some cases, the clustering algorithm 304 constitutes a machine-learning-based clustering algorithm. For example, in some embodiments, the contact-clustering system 106 applies a Mini-Batch-K-means-clustering algorithm as the clustering algorithm 304 to the subset of distribution contacts 303. Accordingly, in some cases, the contact-clustering system 106 partitions distribution contacts (representing n observations) from a subset of distribution contacts into k clusters, where each distribution contact belongs to a cluster with the nearest mean of contact characteristics. In each cluster, one such distribution contact with corresponding contact characteristics represents the nearest mean as a prototype for the cluster. In some such embodiments, the contact-clustering system 106 applies a Mini-Batch-K-Means clustering algorithm as described by David Sculley, "Web-Scale K-Means Clustering," *Proceedings of the 19th International Conference on World Wide Web* 1177-1178 (2010), the entire contents of which are incorporated by reference. Alternatively, in some embodiments, the contact-clustering system 106 applies a K-means-clustering or Nested-Mini-Batch-K-Means-clustering algorithm to the subset of distribution contacts 303 to generate clusters of distribution contacts.

As further shown in FIG. 3A, upon applying the clustering algorithm 304, the contact-clustering system 106 generates clusters of distribution contacts 306a and 306b. For illustrative purposes, the cluster of distribution contacts 306a includes distribution contacts 302a, 302s, 302n, and 302q, and the cluster of distribution contacts 306b includes distribution contacts 302j, 302k, 302o, and 302t. As noted above, the clusters of distribution contacts 306a and 306b and the set of distribution contacts 300 are merely illustrative given space constraints in the figures. In some embodiments, the set of distribution contacts 300—or the clusters of distribution contacts 306a and 306b—can include hundreds to billions of distribution contacts. Accordingly, although not shown in FIG. 3A, the contact-clustering system 106 optionally generates additional clusters of distribution contacts beyond the clusters of distribution contacts 306a and 306b from a sampled subset of distribution contacts.

Turning back now to FIG. 3B, this figure illustrates the contact-clustering system 106 assigning remaining distribution contacts 308 from the set of distribution contacts 300 to the clusters of distribution contacts 306a and 306b in accordance with one or more embodiments. Upon assignment, the clusters of distribution contacts 306a and 306b each include distribution contacts from both the subset of distribution contacts 303 and the remaining distribution contacts 308.

As shown in FIG. 3B, the remaining distribution contacts 308 include distribution contacts 302b-302i, 302l, 302m, 302p, 302r, and 302u. Each distribution contact from the remaining distribution contacts 308 corresponds to various contact characteristics. As suggested by FIG. 3B, in some embodiments, the contact-clustering system 106 compares and maps the contact characteristics from each distribution contact of the remaining distribution contacts 308 to contact characteristics of a representative distribution contact (e.g., a centroid) for one of the clusters of distribution contacts 306a and 306b. The contact-clustering system 106 can accordingly assign each distribution contact from the remaining distribution contacts 308 to a cluster based on the comparison and mapping of contact characteristics.

For example, in some embodiments, the contact-clustering system 106 compares the contact characteristics of each distribution contact from the remaining distribution contacts 308 to the contact characteristics of a representative distribution contact for each cluster (e.g., a centroid for each cluster). In some such cases, the contact-clustering system 106 compares the contact characteristics of each distribution contact from the remaining distribution contacts 308 to the contact characteristics of the distribution contact representing the nearest mean, according to the clustering algorithm 304. Accordingly, the contact-clustering system 106 can use the prototype distribution contact and corresponding contact characteristics as a reference for mapping contact characteristics representing each cluster, as identified by a K-Means-clustering algorithm, a Mini-Batch-K-Means-clustering algorithm, or a Nested-Mini-Batch-K-Means-clustering algorithm.

As further shown in FIG. 3B, based on such contact-characteristic comparisons, the contact-clustering system 106 assigns distribution contacts 302f, 302h, and 302p from the remaining distribution contacts 308 to the cluster of distribution contacts 306a. By contrast, the contact-clustering system 106 assigns distribution contacts 302c, 302e, 302i, and 302l from the remaining distribution contacts 308 to the cluster of distribution contacts 306b. Although not shown in FIG. 3B, in some embodiments, the contact-clustering system 106 further assigns distribution contacts 302b, 302d, 302g, 302m, 302r, and 302u from the remaining distribution contacts 308 to additional generated clusters of distribution contacts. Thus, even though FIG. 3B illustrates only two clusters (as a result of space considerations), the contact-clustering system 106 can assign distribution contacts 302b, 302d, 302g, 302m, 302r, and 302u to additional clusters generated by the contact-clustering system 106 (but not illustrated in FIG. 3B).

Turning now to FIG. 3C, this figure illustrates the contact-clustering system 106 identifying common contact characteristics in the clusters of distribution contacts 306a and 306b in accordance with one or more embodiments. As depicted in FIG. 3C, the contact-clustering system 106 determines, for clusters of distribution contacts, distributions of contact characteristics 310 in the clusters and determines, for a set of distribution contacts, distributions of the contact characteristics 314 in the set. The contact-clustering system 106 further compares the distributions to a commonality threshold 318 and identifies common contact characteristics 320 based on the commonality threshold 318.

As suggested by FIG. 3C, the contact-clustering system 106 can determine different distributions of contact characteristics. For example, the contact-clustering system 106 determines the distributions of contact characteristics 310 in the clusters of distribution contacts 306a and 306b. The contact-clustering system 106 also determines distributions of contact characteristics 314 in the set of distribution contacts 300. When determining such distributions, the contact-clustering system 106 may compute a number or percentage of a particular contact characteristic in a cluster of distribution contacts or in a set of distribution contacts. Alternatively, in some embodiments, the contact-clustering system 106 determines a Gaussian distribution of a particular contact characteristic in a cluster of distribution contacts or in a set of distribution contacts.

As depicted in FIG. 3C, the contact-clustering system 106 computes a first distribution 312a of a first contact characteristic in the first cluster of distribution contacts 306a and a second distribution 312b of a second contact characteristic in the second cluster of distribution contacts 306b. Similarly, the contact-clustering system 106 computes a third distribution 316a of the first contact characteristic in the set of distribution contacts 300 and a fourth distribution 316b of the second contact characteristic in the set of distribution contacts 300.

Regardless of the type of distribution, in certain implementations, the contact-clustering system 106 can determine a distribution for each contact characteristic selected by an administrator as part of a cluster-analysis request. Accordingly, the first, second, third, and fourth distributions 312a, 312b, 316a, and 316b are merely examples of distributions. The contact-clustering system 106 may further determine distributions for additional contact characteristics in one or both of the clusters of distribution contacts 306a and 306b and the set of distribution contacts 300.

As further shown in FIG. 3C, the contact-clustering system 106 compares the distributions to the commonality threshold 318. The commonality threshold 318 may be predetermined, relative, or another suitable threshold for determining when a contact characteristic is common in a cluster of distribution contacts. For instance, in some embodiments, the contact-clustering system 106 compares the first distribution 312a and the second distribution 312b to a predetermined commonality threshold, such as a predetermined number of distribution contacts or a predetermined percentage of distribution contacts indicating that a contact characteristic is common in a given cluster. In some such embodiments, the contact-clustering system 106 sets a predetermined commonality threshold of 70%, 80%, or some other percentage for a predetermined commonality threshold. When a distribution of a contact characteristic is more than (or equal to) the predetermined commonality threshold, in some embodiments, the contact characteristic qualifies as a common contact characteristic.

As a further example, in some embodiments, the contact-clustering system 106 uses a relative commonality threshold to compare a distribution in a cluster of distribution contacts to a distribution for a set of distribution contacts. Accordingly, the contact-clustering system 106 compares (i) the first distribution 312a of the first contact characteristic in the first cluster of distribution contacts 306a to the third distribution 316a of the first contact characteristic in the set of distribution contacts 300 and (ii) the second distribution 312b of the second contact characteristic in the second cluster of distribution contacts 306b to the fourth distribution 316b of the second contact characteristic in the set of distribution contacts 300. In some such embodiments, the contact-clustering system 106 sets a relative commonality threshold of 20%, 30%, or some other percentage for a relative commonality threshold. If the difference between the compared distributions is more than (or equal to) the relative commonality threshold, in some embodiments, the contact characteristic qualifies as a common contact characteristic.

As further shown in FIG. 3C, the contact-clustering system 106 identifies common contact characteristics 320 based on the commonality threshold 318. For example, the contact-clustering system 106 may determine that the first distribution 312a exceeds a predetermined commonality threshold (e.g., 80%) in the first cluster of distribution contacts 306a—or that the difference between the first distribution 312a and the third distribution 316a exceeds a relative commonality threshold (e.g., 30%)—to identify the first contact characteristic as a common contact characteristic. By contrast, the contact-clustering system 106 may determine that the second distribution 312b falls below a predetermined commonality threshold (e.g., 80%) in the second cluster of distribution contacts 306b—and that the difference between the second distribution 312b and the fourth distribution 316b falls below a relative commonality threshold (e.g., 30%)—to disqualify the second contact characteristic as a common contact characteristic.

As noted above, in certain embodiments, the contact-clustering system 106 provides one or more cluster visualizations for display within a graphical user interface. FIGS. 4A-4E illustrate the administrator device 114 presenting graphical user interfaces comprising examples of such visualizations for clusters of distribution contacts, common contact characteristics, and distributions of contact characteristics within (and among) clusters of distribution contacts. As described below, FIGS. 4A-4E depict graphical user interfaces from the perspective of the administrator device 114 implementing computer-executable instructions of the analytics application 116 to perform certain actions for the contact-clustering system 106. While FIGS. 4A-4E indicate user selections by touch gesture with a touch screen, the administrator device 114 may also detect any suitable user interaction, including, but not limited to, an audio input into a microphone, a keyboard input, a mouse click, or a stylus interaction with a touch screen.

Figure 4A:
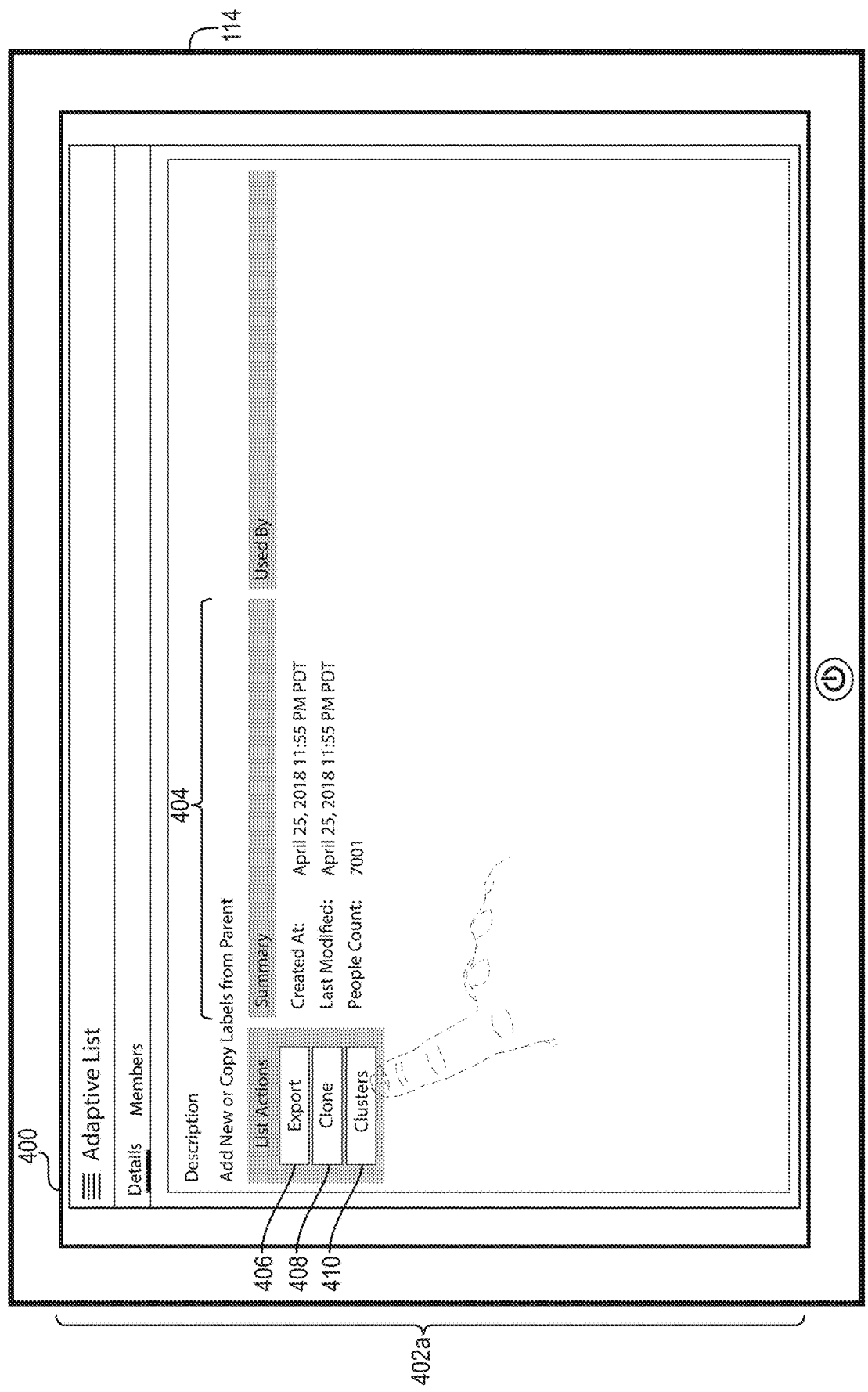
FIGS. 4A-4E illustrate a computing device presenting graphical user interfaces for requesting a cluster analysis of a set of distribution contacts and for cluster visualizations of clusters of distribution contacts in accordance with one or more embodiments.

As shown in FIG. 4A, for instance, the administrator device 114 presents a clustering user interface 402a of the analytics application 116 within a screen 400. Among other graphical elements, the clustering user interface 402a includes a contact-set summary 406. The contact-set summary 404 describes a set of distribution contacts selected by the administrator 118. For instance, the contact-set summary 404 includes dates at which the set of distribution contacts was both created and last modified and a count of distribution contacts within the set of distribution contacts.

Figure 4B:
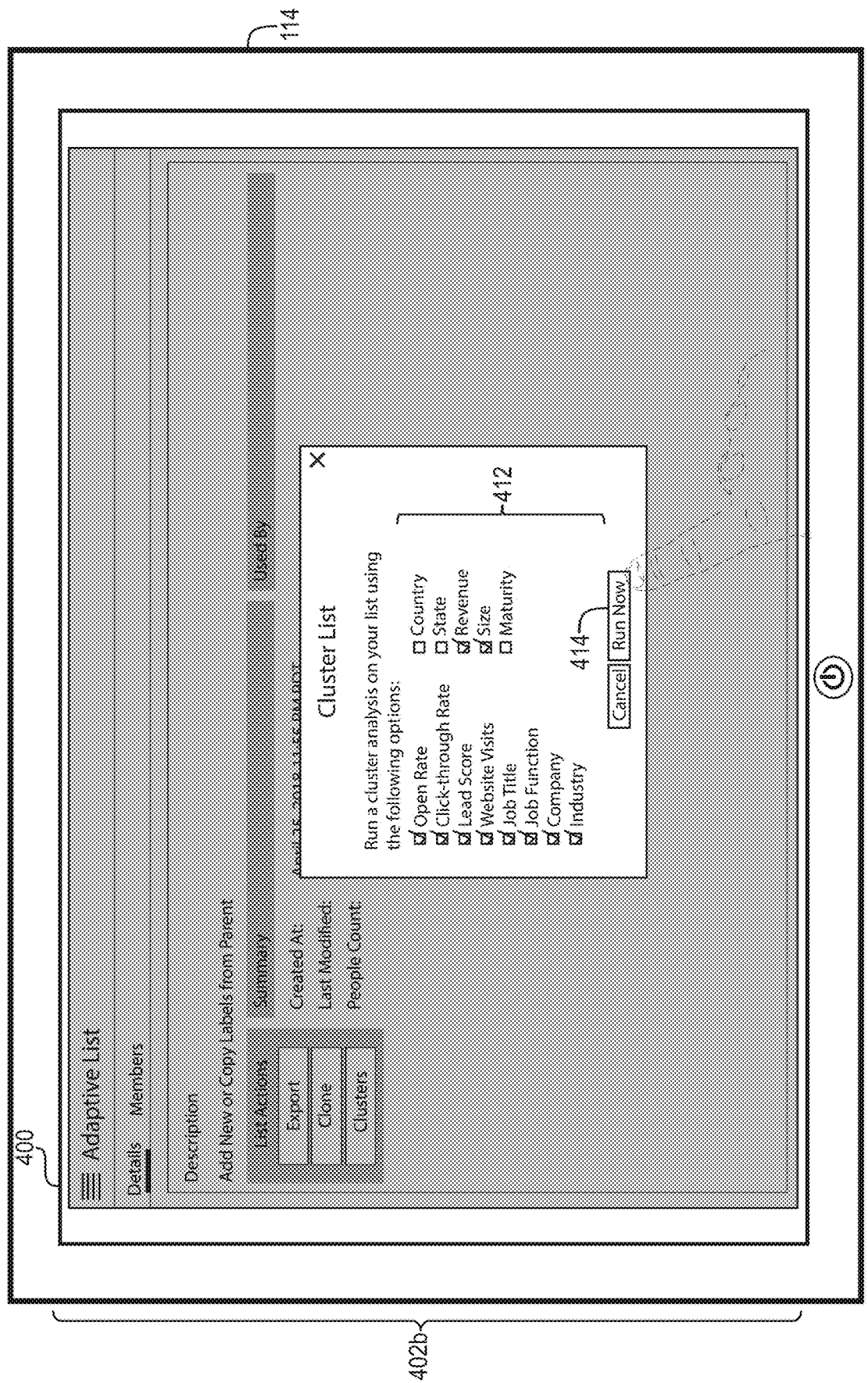

As further indicated by FIG. 4A, the clustering user interface 402a includes an export option 406 to export the set of distribution contacts, a duplication option 408 to duplicate the set of distribution contacts, and a cluster-analysis option 410. In the example shown in FIG. 4A, the administrator device 114 detects a selection of the cluster-analysis option 410. Based on receiving an indication of the user selection from the administrator device 114, the contact-clustering system 106 can either (i) generate cluster visualizations of clusters of distribution contacts from the selected set of distribution contacts for display within a graphical user interface or (ii) provide further options for contact-characteristic categories to the administrator device 114 to selectively include in a cluster analysis. FIG. 4B illustrates an example of the latter options for contact-characteristic categories.

As shown in FIG. 4B, the administrator device 114 presents a clustering user interface 402b based on detecting a user selection of the cluster-analysis option 410. The clustering user interface 402b includes contact-characteristic-category options 412 corresponding to various contact-characteristic categories. Upon detecting a selection of one or more of the contact-characteristic-category options 412, the administrator device 114 includes one or more corresponding contact-characteristic categories for inclusion in a cluster-analysis request to the contact-clustering system 106. In some embodiments, the contact-clustering system 106 includes various contact-characteristic categories by default, such as click-through rate, distribution-contact score, and open rate.

As further indicated by FIG. 4B, the clustering user interface 402b also includes a cluster-analysis-request option 414. The administrator device 114 detects various user selections from the contact-characteristic-category options 412 and the cluster-analysis-request option 414. Based on the detected user selections, the administrator device 114 sends a cluster-analysis request to the contact-clustering system 106 indicating the selected set of distribution contacts and contact-characteristic categories. Consistent with the disclosure above, the contact-clustering system 106 generates clusters of distribution contacts from the selected set of distribution contacts and identifies common contact characteristics in the generated clusters based on receiving the cluster-analysis request. The contact-clustering system 106 further provides various cluster visualizations for display within graphical user interfaces of the administrator device 114, examples of which are depicted in FIGS. 4C-4E.

Figure 4C:
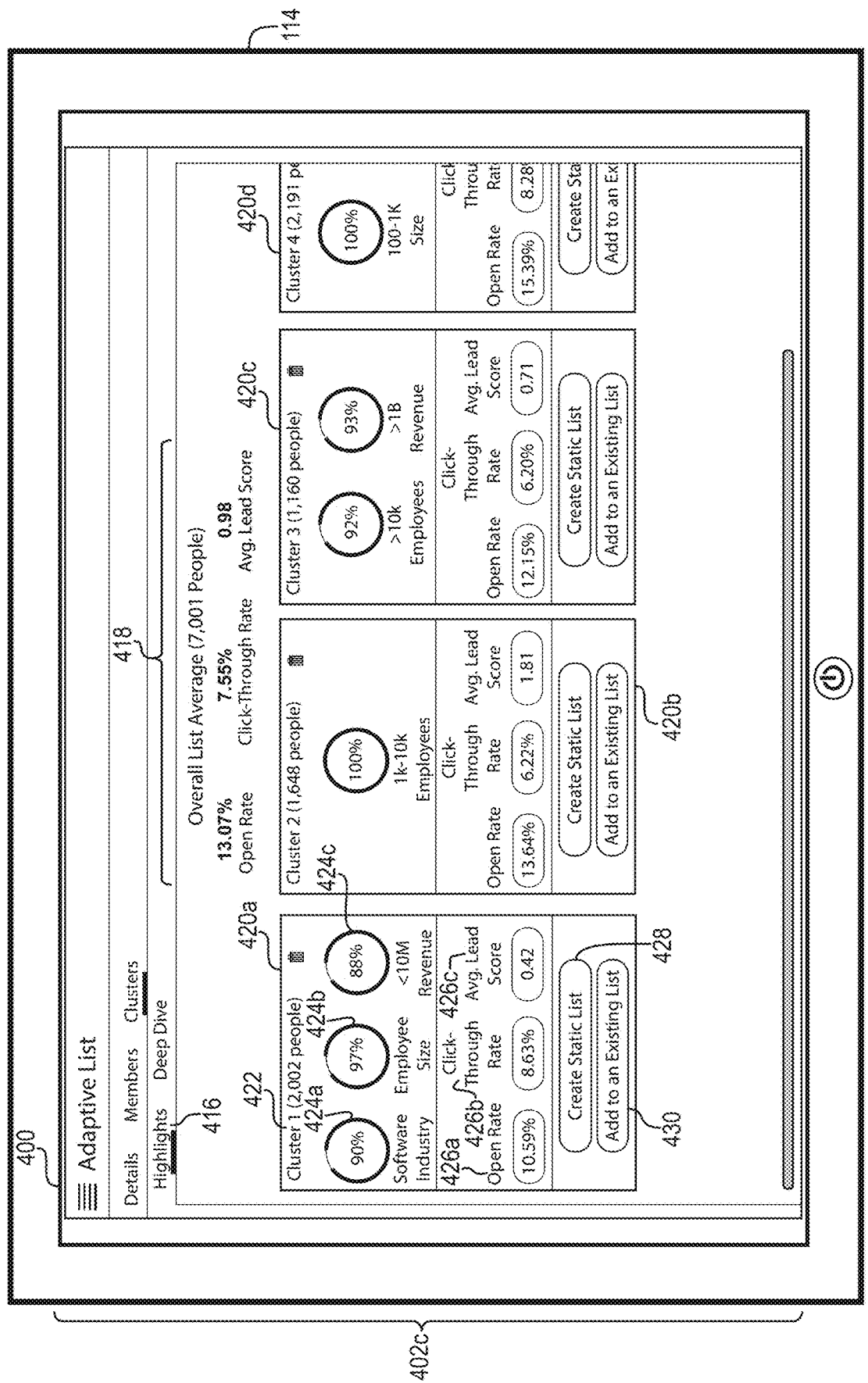
Figure 4D:
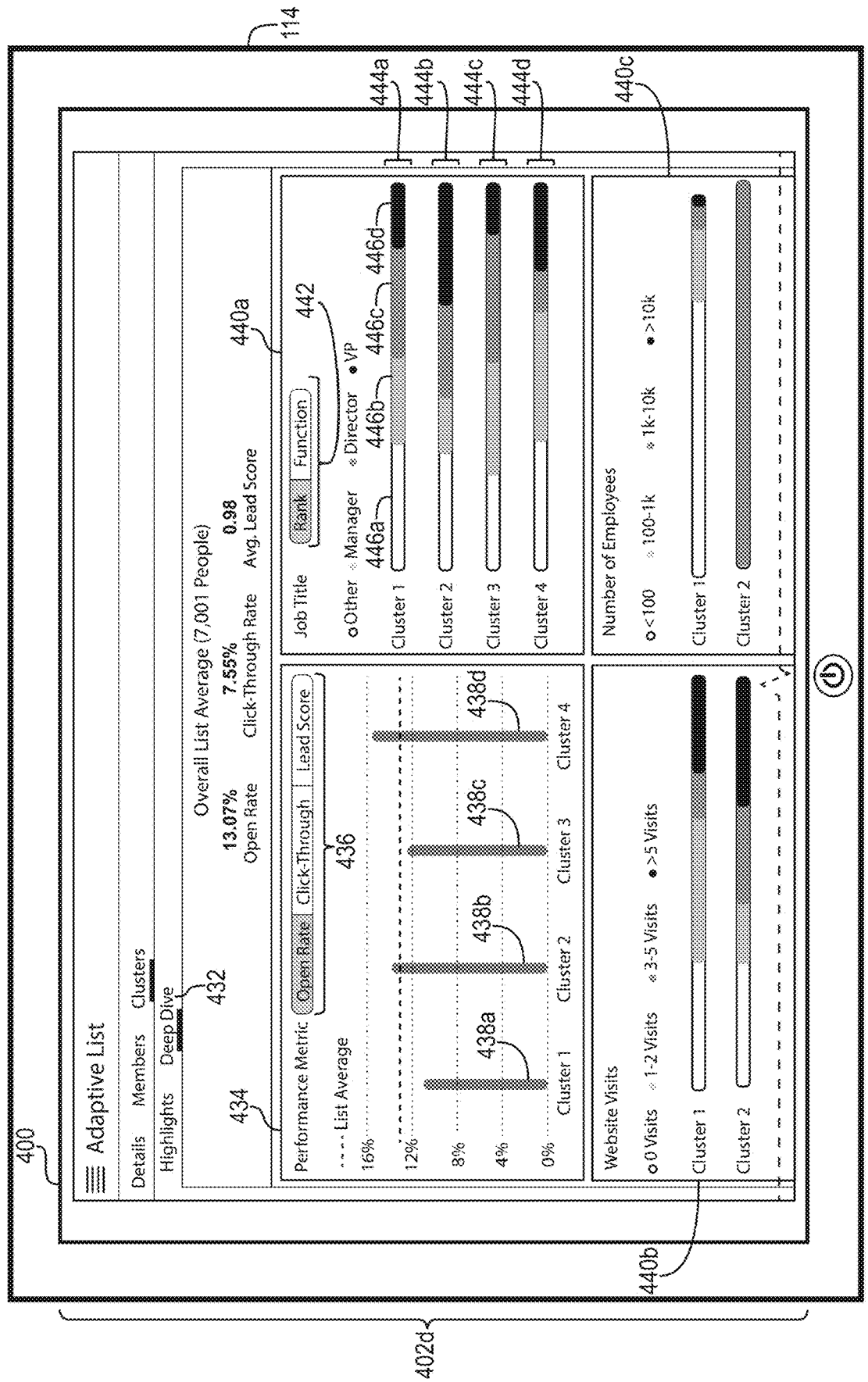
Figure 4E:
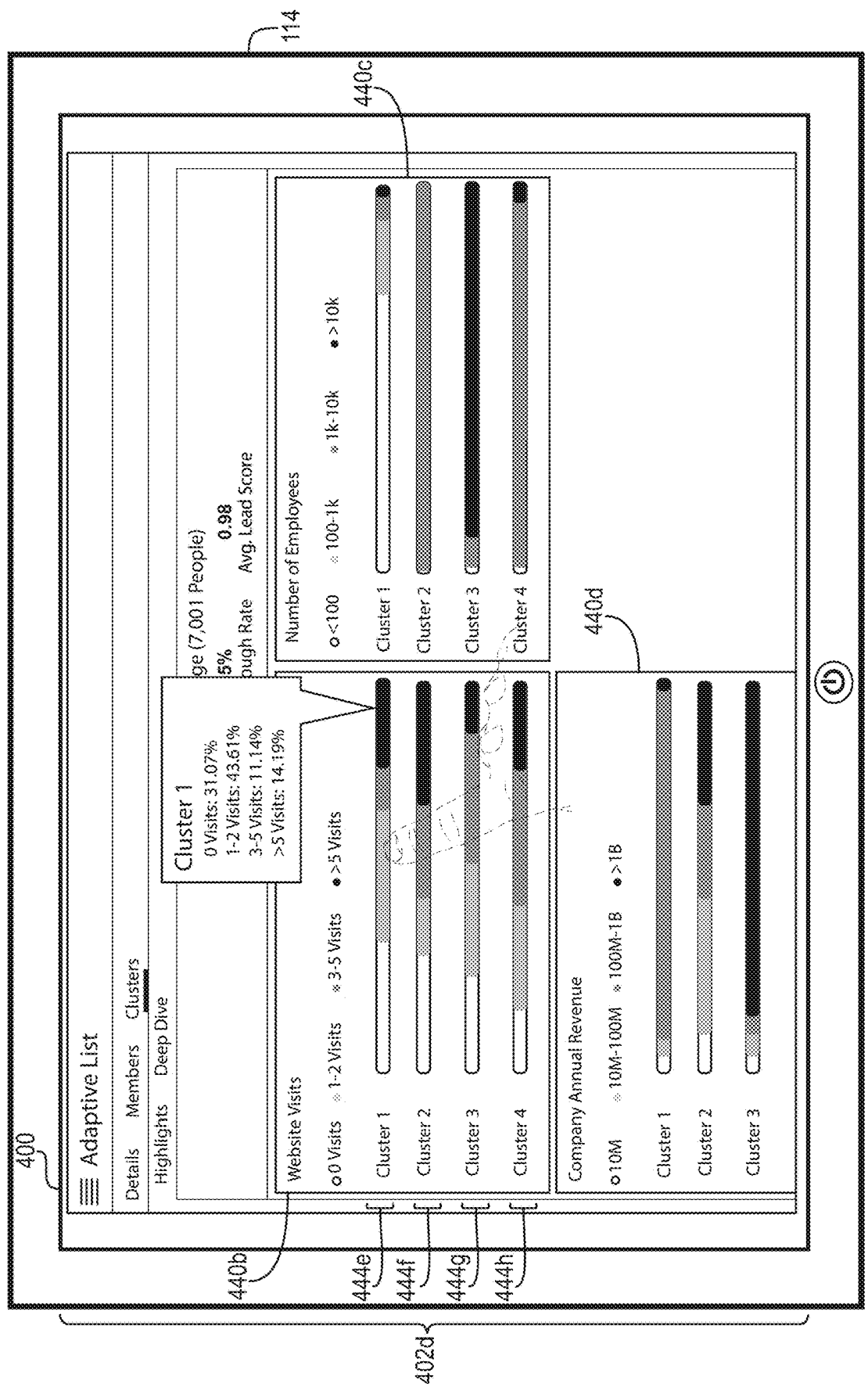

As shown in FIG. 4C, the administrator device 114 presents a clustering user interface 402c comprising contact-set visualizations 418 and cluster visualizations 420a-420d corresponding to clusters of distribution contacts generated by the contact-clustering system 106. In particular, in some embodiments, the administrator device 114 detects a user selection by the administrator 118 of a cluster-overview option 416 and, based on the selection, presents the contact-set visualizations 418 and the cluster visualizations 420a-420d within the clustering user interface 402c.

As indicated by FIG. 4C, the contact-set visualizations 418 indicate various statistics and contact characteristics of the selected set of distribution contacts. For example, in some embodiments, the contact-set visualization 418 indicates a count of distribution contacts within the selected set of distribution contacts and quantity indicators for various contact characteristics. As shown in FIG. 4C, for instance, the contact-set visualizations 418 indicate average values for contact characteristics of distribution contacts within the selected set of distribution contacts—including an average open rate for distribution contacts within the selected set of distribution contacts, an average click-through rate for such distribution contacts, and an average distribution-contact score for such distribution contacts. The average values for contact characteristics indicated within the contact-set visualization 418 are merely examples, and values for any contact characteristic may be displayed in such contact-set visualizations.

As further shown in FIG. 4C, the cluster visualizations 420a-420d respectively include graphical representations for a cluster of distribution contacts. The cluster visualization 420a, for example, includes common-contact-characteristic indicators 424a-424c comprising visual representations of common contact characteristics of a cluster of distribution contacts. In particular, each of the common-contact-characteristic indicators 424a-424c indicate a quantity of distribution contacts within the cluster of distribution contacts corresponding to a common contact characteristic.

As further shown in the cluster visualization 420a, the common-contact-characteristic indicators 424a-424c indicate a percentage of distribution contacts within the corresponding cluster of distribution contacts having a particular common contact characteristic. For instance, the common-contact-characteristic indicators 424a-424c respectively indicate a percentage of distribution contacts in a particular industry, a percentage of distribution contacts in a company having more than (or equal to) a particular number of employees, and a percentage of distribution contacts in a company having more than (or equal to) a particular annual revenue. Common-contact-characteristic indicators may likewise indicate quantities for any other contact characteristic the contact-clustering system 106 finds common in a cluster of distribution contacts.

In addition to the common-contact-characteristic indicators 424a-424c, the cluster visualization 420a includes contact-characteristic indicators 426a-426c. The contact-characteristic indicators 426a-426c comprise visual representations of contact characteristics selected by the administrator 118 or by the contact-clustering system 106 (e.g., selected by default). In this example, the contact-characteristic indicators 426a-426c respectively indicate an average value for a contact characteristic corresponding to distribution contacts within the cluster of distribution contacts.

As further shown in FIG. 4C, the clustering user interface 402c includes distribution options for the cluster of distribution contacts corresponding to the cluster visualization 420a. In particular, the clustering user interface 402c includes a distribution-set-creation option 428. Upon detecting selection of the distribution-set-creation option 428, the administrator device 114 sends an indication to the contact-clustering system 106 to generate a new set of distribution contacts comprising the cluster of distribution contacts. Having created the set of distribution contacts, in some embodiments, the contact-clustering system 106 further provides selectable options to distribute digital content from a digital content campaign to computing devices associated with distribution contacts from the cluster of distribution contacts. The clustering user interface 402c further includes a distribution-set-addition option 430 that (upon user selection) causes the contact-clustering system 106 to add distribution contacts from the cluster of distribution contacts to an existing set of distribution contacts.

In addition (or in the alternative) to the distribution options shown in FIG. 4C, in some embodiments, the contact-clustering system 106 provides, for display within a clustering user interface of the administrator device 114, distribution options specific to digital content campaigns (or to different digitial content from a digital content campaign) for clusters of distribution contacts. For example, in certain implementations, the contact-clustering system 106 provides digital-content-campaign options corresponding to a particular cluster of distribution contacts or digital-content options from a digital content campaign corresponding to a particular cluster of distribution contacts. Based on detecting a user selection of a particular digital-content-campaign option (or a digital-content option) for a cluster of distribution contacts, the administrator device 114 sends an indication of the user selection to the contact-clustering system 106. Based on receiving such an indication, the contact-clustering system 106 distributes digital content from the selected digital content campaign (or the selected digital content from a digital content campaign) to computing devices corresponding to distribution contacts from the cluster of distribution contacts (e.g., by sending emails, texts, or providing images on web sites or within applications of computing devices of distribution contacts).

As further shown in FIG. 4C, the contact-clustering system 106 provides common-contact-characteristic indicators, contact-characteristic indicators, and distribution options in (or corresponding to) each of the cluster visualizations for other clusters of distribution contacts. As further suggested above, in some embodiments, the contact-clustering system 106 further provides digital-content-campaign options (or digital-content options) for each cluster of distribution contacts. Based on user selections, the contact-clustering system 106 can accordingly provide (i) cluster visualizations identifying different common contact characteristics for different clusters of distribution contacts and (ii) distribution options to distribute different digital content to different clusters, as selected by a user.

Turning back now to FIG. 4D, this figure illustrates the administrator device 114 presenting (via a display screen) a clustering user interface 402d comprising cluster visualizations 434 and 440a-440c for various contact characteristics of corresponding clusters of distribution contacts. In particular, in some embodiments, the administrator device 114 detects a user selection by the administrator 118 of a cluster-characteristics-detail option 432 and, based on the selection, presents the cluster visualizations 434 and 440a-440c within the clustering user interface 402d.

As indicated by FIG. 4D, the cluster visualization 434 comprises a bar graph of distributions for contact characteristics from a contact-characteristic category corresponding to various clusters of distribution contacts. In particular, the cluster visualization 434 includes bar visualizations 438a-438d each corresponding to a different cluster of distribution contacts and indicating a percentage of distribution contacts within a different cluster corresponding to a contact characteristic. The cluster visualization 434 accordingly enables comparison of contact characteristics among different clusters of distribution contacts from the selected set of distribution contacts.

As further shown in FIG. 4D, the cluster visualization 434 includes characteristic-category-visualization options 436. Upon detecting a user selection of one of the characteristic-category-visualization options 436, the administrator device 114 presents a corresponding (and different) cluster visualization for contact characteristics from a different contact-characteristic category. The contact-clustering system 106 can accordingly provide a cluster visualization, such as a bar graph, for any contact characteristic selected by the administrator 118 and for comparison across clusters of distribution contacts.

In addition to the cluster visualization 434, the clustering user interface 402d also includes the cluster visualizations 440a-440c. The cluster visualization 440a, for example, comprises a segmented sidebar graph of distributions for contact characteristics from a contact-characteristic category corresponding to various clusters. In particular, the cluster visualization 440a includes cluster-bar visualizations 444a-444d, where each cluster-bar visualization corresponds to a different cluster of distribution contacts. The cluster-bar visualizations 444a-444d respectively include visual quantity indicators indicating a quantity of distribution contacts within the cluster corresponding to a contact characteristic.

The cluster-bar visualization 444a, for example, includes visual quantity indicators 446a-446d respectively represented by a different color or shade. The visual quantity indicators 446a-446d also respectively indicate a quantity of distribution contacts within a cluster corresponding to contact characteristics. For instance, the visual quantity indicators 446a-446d respectively indicate a quantity of distribution contacts corresponding to miscellaneous job titles, manager, director, and vice president. In each of the cluster-bar visualizations 444a-444d, a larger or smaller visual quantity indicator comprising a particular color or shade corresponds to a larger or smaller quantity of distribution contacts for a particular contact characteristic.

As further shown in FIG. 4D, the cluster visualization 440a includes characteristic-category-visualization options 442. Upon detecting a user selection of one of the characteristic-category-visualization options 442, the administrator device 114 presents a corresponding (and different) cluster visualization for a different contact-characteristic category.

As presented in the segmented sidebar graph, the cluster visualization 440a accordingly enables a visual comparison of contact-characteristic quantities among different clusters of distribution contacts in a single snapshot, as selected by the administrator 118.

FIG. 4E illustrates full depictions of cluster visualizations 440b and 440c, a cluster visualization 440c, and interactive options in such cluster visualizations. In particular, FIG. 4E illustrates the administrator device 114 presenting an additional portion of the clustering user interface 402d comprising the cluster visualizations 440b-440d for various contact characteristics of corresponding clusters of distribution contacts. Similar to the cluster visualization 440a, the cluster visualizations 440b-440d each comprise a segmented sidebar graph of distributions for different contact characteristics from a contact-characteristic category corresponding to various clusters.

As FIG. 4E illustrates, cluster visualizations can be interactive and include additional information about a cluster of distribution contacts upon user selection. The cluster visualization 440b, for example, includes cluster-bar visualizations 444e-444h for different clusters of distribution contacts and visual quantity indicators within each of the cluster-bar visualizations 444e-444h. Each of the cluster-bar visualizations 444e-444h include selectable options to view additional segmented statistics or other information concerning a cluster of distribution contacts.

Upon detecting a user selection of the cluster-bar visualization 444e, for example, the administrator device 114 presents a cluster-statistic overlay 446 that includes a segmented breakdown of values for contact characteristics corresponding to distribution contacts within the cluster of distribution contacts. While the cluster-statistic overlay 446 in this example includes values for website visits corresponding to distribution contacts, the contact-clustering system 106 can provide cluster-statistic overlays or other visual indicators of any contact characteristic upon user selection of portions of a cluster visualization.

Figure 5A:
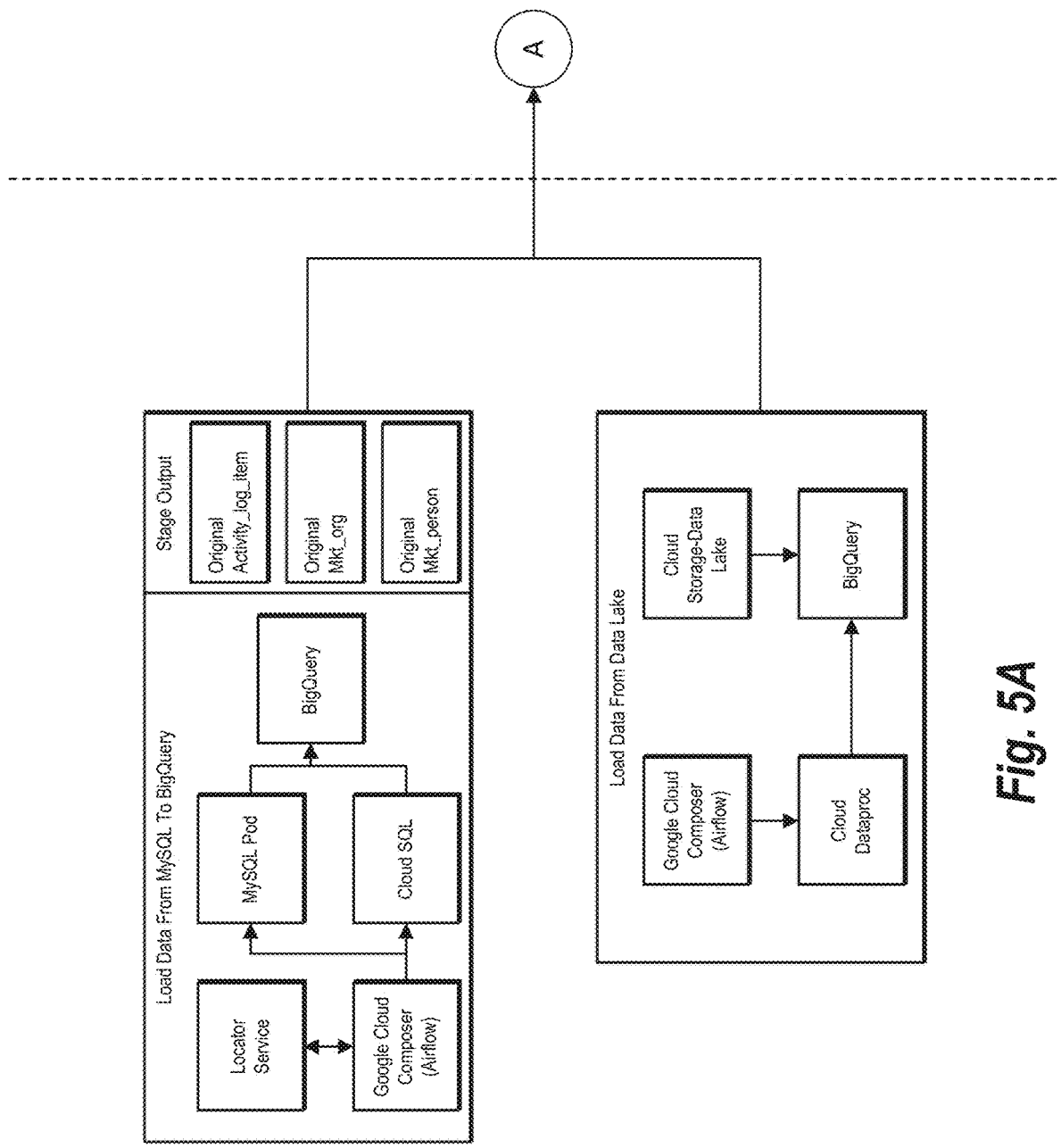
FIGS. 5A-5C illustrate the contact-clustering system performing an extract, transform, and load ("ETL") process for datasets corresponding to distribution contacts in accordance with one or more embodiments.
Figure 5B:
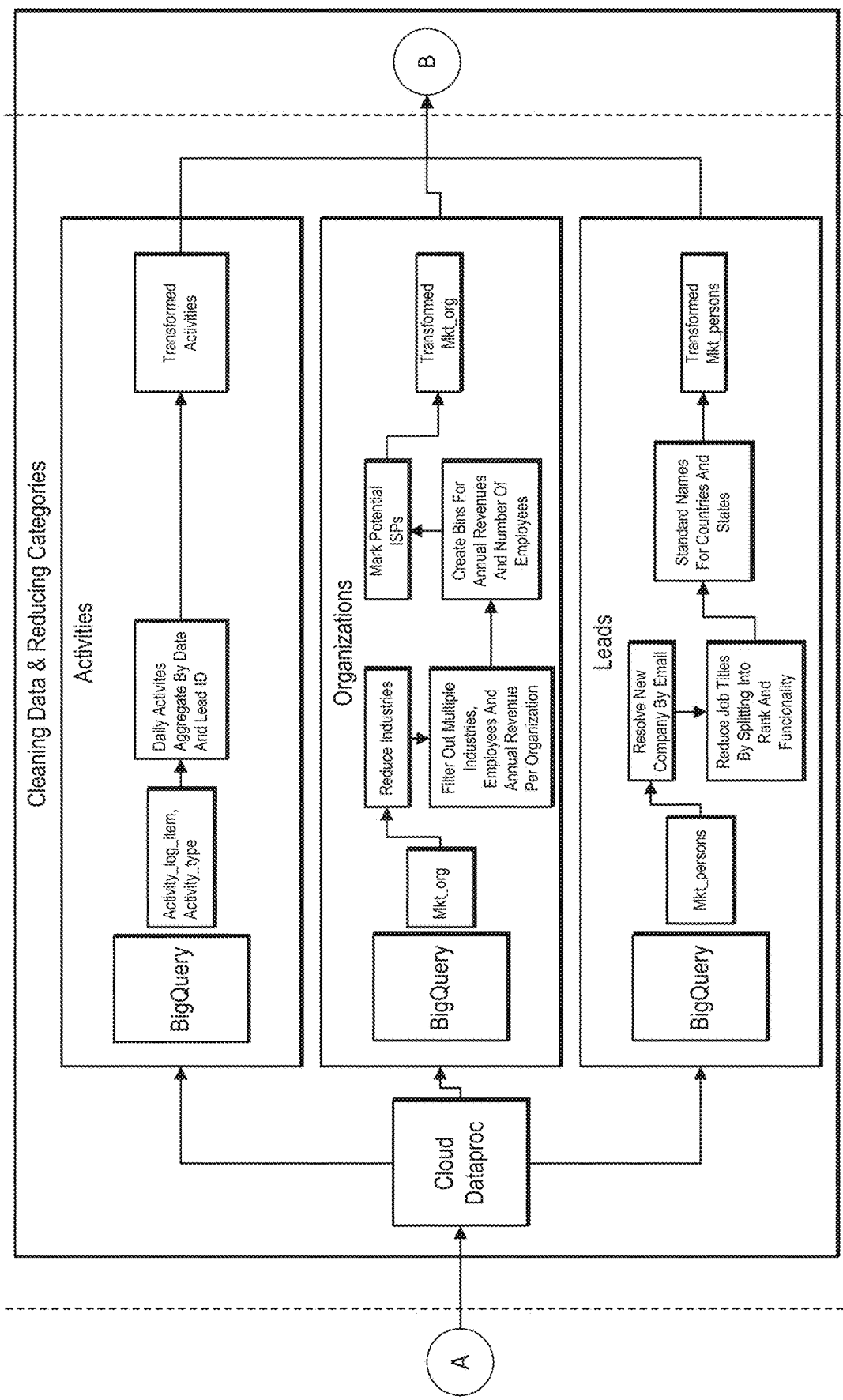
Figure 5C:
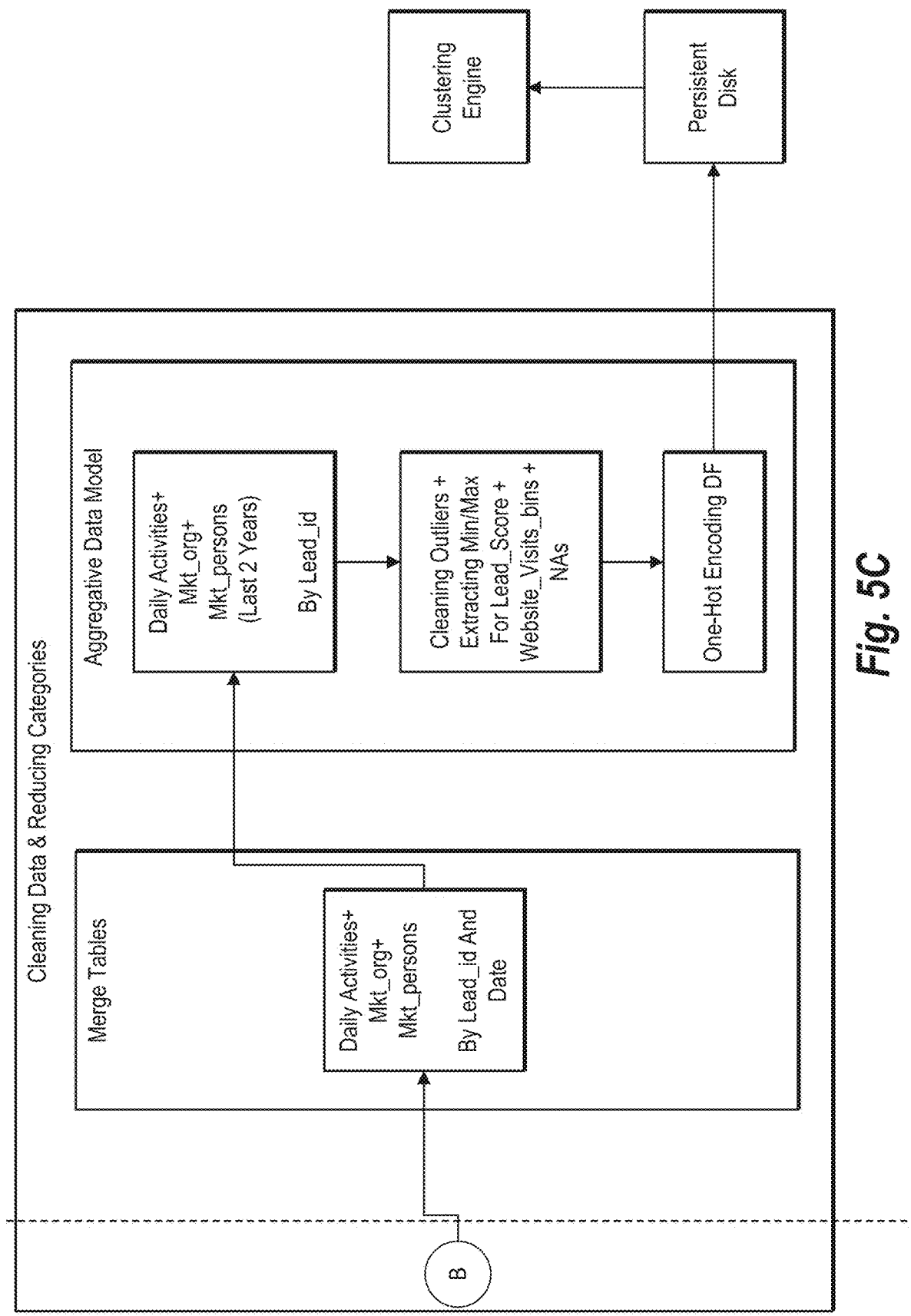

As suggested above, in some embodiments, the contact-clustering system 106 tracks and stores data corresponding to distribution contacts. FIGS. 5A-5C illustrate the contact-clustering system 106 performing an extract, transform, and load ("ETL") process for datasets corresponding to distribution contacts in accordance with one or more embodiments. In some such embodiments, the contact-clustering system 106 performs the ETL process depicted in FIGS. 5A-5C on a daily basis.

As shown in FIG. 5A, for example, the contact-clustering system 106 uses a cloud composer to extract data corresponding to distribution contacts from one or more databases (e.g., MySQL and Cloud SQL) and copies the data to a web service for cleaning and analysis (e.g., BigQuery). The contact-clustering system 106 further uses the web service to output data in a particular format, such as by identifying the data according to an activity-log item, an organization, and a person or distribution contact. Similarly, as further shown in FIG. 5A, the contact-clustering system 106 uses a cloud composer to load data corresponding to distribution contacts from a data lake to a web service for cleaning and analysis (e.g., BigQuery).

As shown in FIG. 5B, the contact-clustering system 106 further uses a cloud dataproc (e.g., Spark and Hadoop service) and the web service to clean (and reduce categories for) the data corresponding to the distribution contacts. For example, the contact-clustering system 106 cleans and organizes the data corresponding to the distribution contacts into categories for a transformed activity-log item, a transformed organization, and a transformed person or distribution contact. In some cases, the contact-clustering system 106 uses the web service to organize activity-log items by date and distribution-contact identifier; filter and create bins for industries, revenue, and number of employees for activities related to an organization; and reduce and rank job titles, functionality, country, and state for activities related to a particular distribution contact.

As shown in FIG. 5C, the contact-clustering system 106 further merges the cleaned data corresponding to distribution contacts into tables by distribution-contact identifier and date. After merging the data into such tables, the contact-clustering system 106 aggregates the data from the merged table into a data model by distribution-contact identifier accounting for multiple years, cleans outliers from the data (e.g., removes an illogically or unreasonably high and an illogically or unreasonably low distribution-contact score), and encodes the data to be saved on a persistent disk. Upon saving the merged and aggregated data to the persistent disk, the contact-clustering system 106 can use a clustering engine to access such data corresponding to distribution contacts.

In some embodiments, the contact-clustering system 106 reorganizes the data corresponding to distribution contacts for particular contact characteristics, as follows:

Industry: When the distribution contact's organization belongs to a group of different industries, the contact-clustering system 106 selects the industry that applies for most of the distribution contacts from the same organization.

Job Title: the contact-clustering system 106 combines into a single job title the same job titles written in different ways (e.g., low/capital letter, abbreviations, typos). For example, the contact-clustering system 106 combines "CTO," "cto," "C.T.O.," "Chief Technology Officer," "Chief Technologist," "Chief Technology officer," etc. into "Chief Technology Officer" as a contact characteristic for a job title.

Country: the contact-clustering system 106 combines into one country the same countries written in different ways. For example, the contact-clustering system 106 combines "USA," "US," "United States," "United States of America," etc. into the "United States of America" as a contact characteristic for a country.

Company: the contact-clustering system 106 combines into one company the same company names written in different ways. For example, the contact-clustering system 106 combines "Marketo," "Marketo inc.," "Marketo Corp.," "Marketo Corporation," "Marketo EMEA," "Marketo US," "Marceto," etc. into "Marketo" as a contact characteristic for a company.

Company Size: the contact-clustering system 106 categorizes a distribution contact's organization into four groups by number of employees: "<100 Employees," "100-1000 Employees," "1000-10000 Employees," ">10000 Employees." When conflicting data indicates a distribution contact's organization has different numbers of employees, the contact-clustering system 106 selects the category that applies to most of the distribution contacts from the same organization.

Revenue: the contact-clustering system 106 categorizes a distribution contact's organization revenue into four groups: "<10 M $," "10 M-100 M $," "100 M-1 B $," ">1 B $." When conflicting data indicates that the distribution contact's organization has different annual revenue, the contact-clustering system 106 selects the category that applies to most of the distribution contacts from the same organization.

State: the contact-clustering system 106 combines into one state the same state written in different ways. For example, the contact-clustering system 106 combines "CA," "California," "Kalifornia," "Calefornia," etc. into "California" as a contact characteristic for a state.

Job Function: the contact-clustering system 106 combines into one job function the same job function written in different ways. For example, the contact-clustering system 106 combines "HR," "hr," "H.R.," "Human Resources," "Human Resource," etc. into "HR" as a contact characteristic for a job function.

Distribution-Contact Score: the contact-clustering system 106 removes outliers, such as extremely high and extremely low distribution_contact_scores. The contact-clustering system 106 scales this contact characteristic with a min-max scaler to have values only between 0 and 1 for the clustering engine.

Website Visits: the contact-clustering system 106 categories a distribution contact's webpage visits into four groups: "0 Visits," "1-2 Visits," "3-5 Visits," and ">5 Visits."

Click-Through Rate: the contact-clustering system 106 calculates a click-through rate by determining the number of electronic messages the distribution contact clicked on divided by the number of electronic messages sent to the distribution contact. In some embodiments, the contact-clustering system 106 further modifies click-through rates higher than 1 or lower than 0 to be 1 and 0, respectively.

Open Rate: the contact-clustering system 106 calculates the open rate by determining the number of electronic messages a distribution contact opened divided by the number of electronic messages sent to the distribution contact. In some embodiments, the contact-clustering system 106 further modifies open rates higher than 1 or lower than 0 to be 1 and 0, respectively.

Maturity: the contact-clustering system 106 categorizes the maturity of a distribution contact into five groups: "<1 Month," "1-3 Months," "4-6 Months," "7-12 Months," and ">12 Months," based on how much time a distribution contact exists in a customer-relationship management system.

Figure 6:
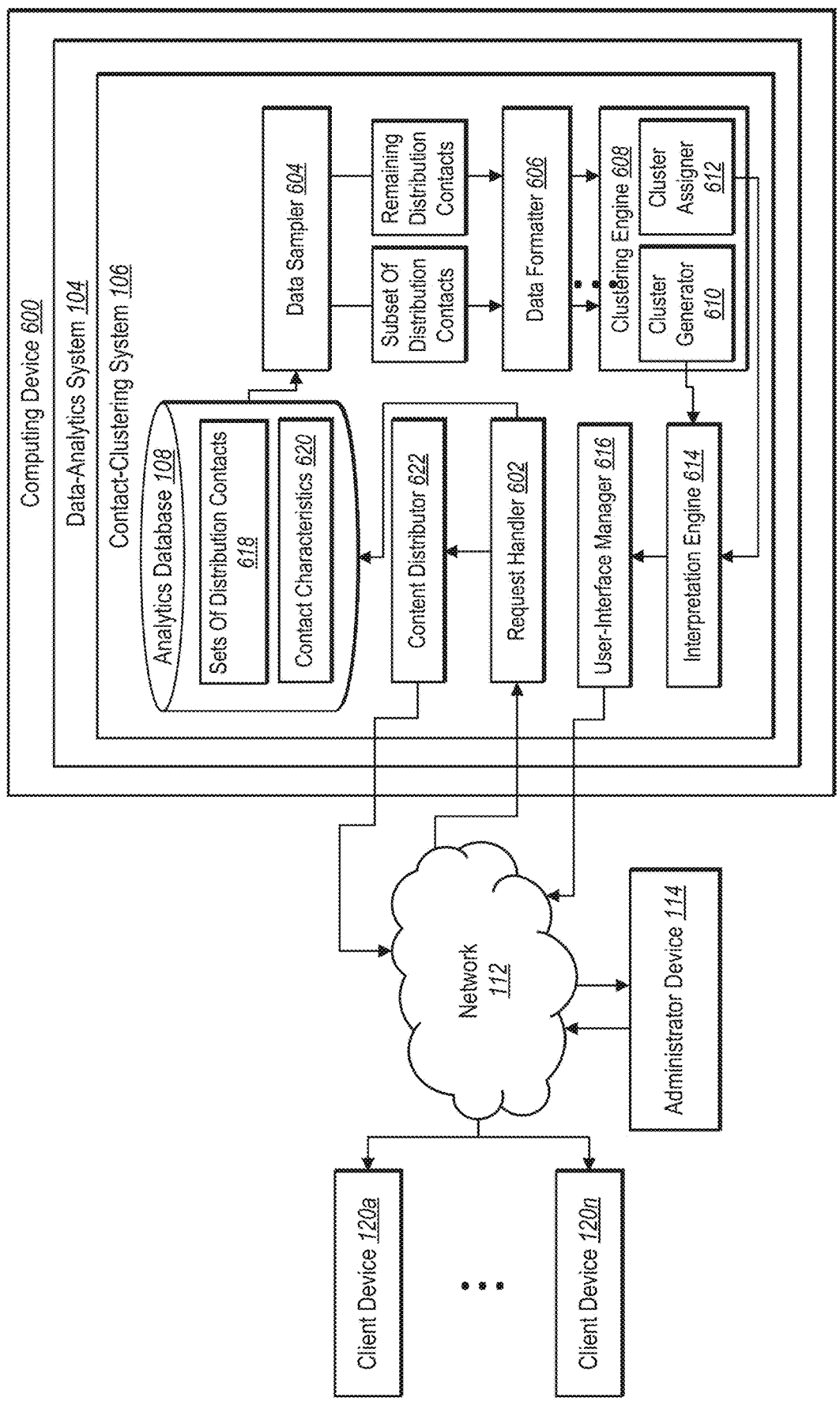
FIG. 6 illustrates a schematic diagram of the contact-clustering system of FIG. 1 in accordance with one or more embodiments.

Turning now to FIG. 6, this figure provides additional detail regarding components and features of the contact-clustering system 106. In particular, FIG. 6 illustrates a computing device 600 implementing the data-analytics system 104 and the contact-clustering system 106. In some embodiments, the computing device 600 comprises one or more servers (e.g., the server(s) 102). In other embodiments, the computing device 600 comprises one or more client devices (e.g., the administrator device 114).

As shown in FIG. 6, the computing device 600 includes the data-analytics system 104. In some embodiments, the data-analytics system 104 uses its components to perform various digital-analytics functions or digital-content-campaign functions. Additionally, in some cases, the data-analytics system 104 collects data corresponding to distribution contacts and events from client devices (e.g., by collecting data tracking application uses, orders, purchases, or webpage views).

As further shown in FIG. 6, the computing device 600 includes the contact-clustering system 106. The contact-clustering system 106 includes, but is not limited to, a request handler 602, a data sampler 604, a data formatter 606, a clustering engine 608, an interpretation engine 614, a user-interface manager 616, a content distributor 622, and/or the analytics database 108. The following paragraphs describe each of these components in turn.

As just mentioned, the contact-clustering system 106 includes the request handler 602. The request handler 602 receives various cluster-analysis requests and distribution requests from computing devices. As indicated in FIG. 6, the request handler 602 can receive a cluster-analysis request from the administrator device 114 over the network 112, including, for example, clustering-analysis requests that identify one or both of a set of distribution contacts and contact-characteristic categories and distribution requests to distribution digital content to some (or all) of the client devices 120a-120n corresponding to a cluster of distribution contacts. In some embodiments, the request handler 602 subsequently requests data from (or sends a fetch command to) the analytics database 108 corresponding to one or both of the set of distribution contacts and the contact-characteristic categories identified by a cluster-analysis request from the administrator 118. Additionally, in certain implementations, the request handler 602 feeds or inputs data into the content distributor 622 identifying digital content from a digitial content campaign and client devices for distribution.

As further shown in FIG. 6, the contact-clustering system 106 includes the data sampler 604. The data sampler 604 samples subsets of distribution contacts from sets of distribution contacts 618 and corresponding contact characteristics 620 stored in the analytics database 108. Consistent with the disclosure above, the data sampler 604 can use a sampling algorithm to sample a subset of distribution contacts from a set of distribution contacts based on a cluster-analysis request, as depicted in FIG. 3A for example. As further shown in FIG. 6, the data sampler 604 feeds or inputs a subset of distribution contacts and remaining distribution contacts (and their respective contact characteristics) from the set of distribution contacts to the data formatter 606.

As its name suggests, the data formatter 606 formats and otherwise prepares subsets of distribution contacts and/or remaining distribution contacts—and corresponding contact characteristics—for analysis by the clustering engine 608. For instance, in some embodiments, the data formatter 606 formats a subset of distribution contacts as inputs for a clustering algorithm. The data formatter 606 may further format the remaining distribution contacts to match the formatting of distribution contacts in clusters of distribution contacts. The data formatter 606 subsequently feeds or inputs the formatted subset of distribution contacts and the formatted remaining distribution contacts to the clustering engine 608.

As further indicated by FIG. 6, the clustering engine 608 generates clusters of distribution contacts from subsets of distribution contacts and assigns remaining distribution contacts to clusters of distribution contacts. For example, in some embodiments, the clustering engine 608 uses a cluster generator 610 to apply a clustering algorithm to a formatted subset of distribution contacts based on a corresponding subset of contact characteristics, as depicted in FIG. 3B. Further, in some embodiments, the clustering engine 608 uses a cluster assigner 612 to assign remaining distribution contacts from a set of distribution contacts to the generated clusters of distribution contacts based on contact characteristics corresponding to the remaining distribution contacts, as depicted in FIG. 3B. The clustering engine 608 further passes one or both of the subset of distribution contacts and the remaining distribution contacts (and each distribution contact's contact characteristics) to the interpretation engine 614 (e.g., with an identifier for each distribution contact's respective cluster).

As further shown in FIG. 6, the interpretation engine 614 identifies common contact characteristics and computes values for contact characteristics corresponding to clusters of distribution contacts. For example, in some embodiments, the interpretation engine 614 determines distributions of contact characteristics in clusters of distribution contacts and applies a commonality threshold to identify common contact characteristics in a given cluster of distribution contacts, as depicted in FIG. 3C. The interpretation engine 614 may further compute averages or other values for contact characteristics within a cluster of distribution contacts or within a set of distribution contacts. The interpretation engine 614 further feeds or inputs data indicating any common contact characteristics and values for any contact characteristics to the user-interface manager 616.

The user-interface manager 616 generates data for graphical user interfaces, generates visualizations for sets of distribution contacts and clusters of distribution contacts, and/or provides data representing such visualizations to the administrator device 114. For example, the user-interface manager 616 can generate data for the clustering user interfaces and cluster visualizations depicted in FIGS. 4A-4E, including options to generate a cluster-analysis request, a summary of clusters of distribution contacts, or statistics concerning specific contact characteristics for a cluster of distribution contacts.

As further shown in FIG. 6, the content distributor 622 receives distribution requests from the request handler 602 and distributes digital content to client devices based on such requests. For example, in some embodiments, the content distributor 622 receives data indicating a user selection of a particular digital-content-campaign option (or a digital-content option) for a cluster of distribution contacts. Based on receiving data with such an indication, the content distributor 622 distributes or sends digital content from the selected digital content campaign (or the selected digital content from a digital content campaign) over the network 112 to some (or all) of the client devices 120a-120n corresponding to distribution contacts from the cluster of distribution contacts.

Each of the components 602-622 of the contact-clustering system 106 can include software, hardware, or both. For example, the components 602-622 can include one or more instructions stored on a computer-readable storage medium and executable by processors of one or more computing devices, such as a client device or server device. When executed by the one or more processors, the computer-executable instructions of the contact-clustering system 106 can cause the computing device(s) to perform the methods described herein. Alternatively, the components 602-622 can include hardware, such as a special-purpose processing device to perform a certain function or group of functions. Alternatively, the components 602-622 of the contact-clustering system 106 can include a combination of computer-executable instructions and hardware.

Furthermore, the components 602-622 of the contact-clustering system 106 may, for example, be implemented as one or more operating systems, as one or more stand-alone applications, as one or more generators of an application, as one or more plug-ins, as one or more library functions or functions that may be called by other applications, and/or as a cloud-computing model. Thus, the components 602-622 may be implemented as a stand-alone application, such as a desktop or mobile application. Furthermore, the components 602-622 may be implemented as one or more web-based applications hosted on a remote server. The components 602-622 may also be implemented in a suite of mobile device applications or "apps." To illustrate, the components 602-622 may be implemented in a software application, including, but not limited to, ADOBE EXPERIENCE CLOUD, ADOBE MARKETING CLOUD, ADOBE CAMPAIGN, and ADOBE ANALYTICS. "ADOBE," "EXPERIENCE CLOUD," "CAMPAIGN," "MARKETING CLOUD," and "ANALYTICS" are either registered trademarks or trademarks of Adobe Inc. in the United States and/or other countries.

Figure 7:
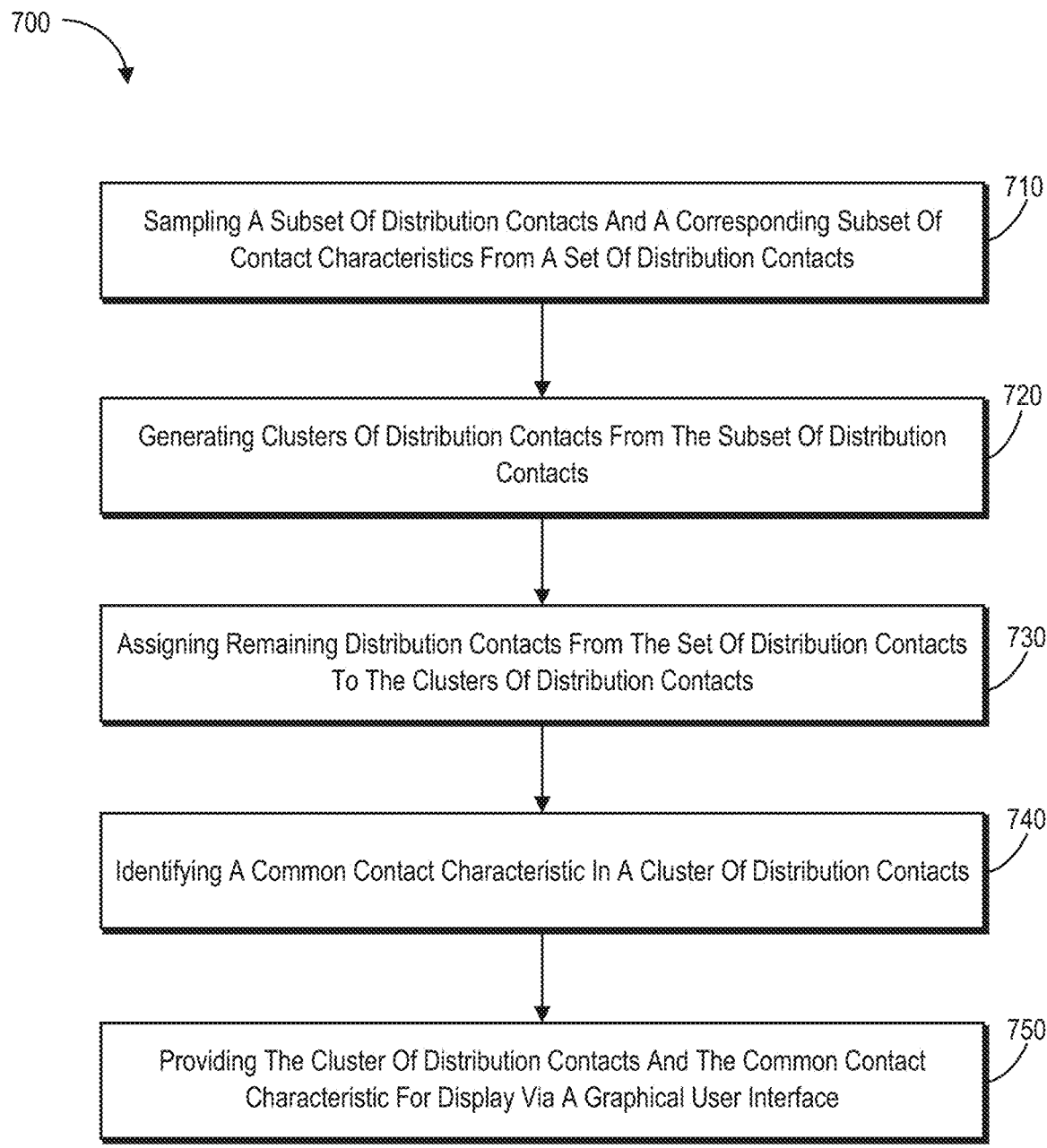
FIG. 7 illustrates a flowchart of a series of acts for generating clusters of distribution contacts from a subset of distribution contacts and assigning remaining distribution contacts to the generated clusters in accordance with one or more embodiments.

Turning now to FIG. 7, this figure illustrates a flowchart of a series of acts 700 of generating clusters of distribution contacts from a subset of distribution contacts and assigning remaining distribution contacts to the generated clusters in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable storage medium can comprise instructions that, when executed by one or more processors, cause a computing device to perform the acts depicted in FIG. 7. In still further embodiments, a system can perform the acts of FIG. 7.

As shown in FIG. 7, the acts 700 include an act 710 of sampling a subset of distribution contacts and a corresponding subset of contact characteristics from a set of distribution contacts. In particular, in some embodiments, the act 710 includes sampling a subset of distribution contacts and a corresponding subset of contact characteristics from a distribution dataset comprising a set of distribution contacts.

As further shown in FIG. 7, the acts 700 include an act 720 of generating clusters of distribution contacts from the subset of distribution contacts. In particular, in some embodiments, the act 720 includes generating clusters of distribution contacts from the subset of distribution contacts based on a clustering algorithm and the subset of contact characteristics.

For example, in some embodiments, generating the clusters of distribution contacts from the subset of distribution contacts comprises utilizing the clustering algorithm to generate a first cluster of distribution contacts and a second cluster of distribution contacts from the subset of distribution contacts based on the subset of contact characteristics. Further, in some cases, generating the clusters of distribution contacts from the subset of distribution contacts comprises applying a Mini-Batch-K-Means-clustering algorithm to the subset of distribution contacts and the subset of contact characteristics.

As further shown in FIG. 7, the acts 700 include an act 730 of assigning remaining distribution contacts from the set of distribution contacts to the clusters of distribution contacts. In particular, in certain implementations, the act 730 includes assigning remaining distribution contacts from the set of distribution contacts to the clusters of distribution contacts based on contact characteristics corresponding to the remaining distribution contacts.

For example, in certain implementations, assigning the remaining distribution contacts from the set of distribution contacts to the clusters of distribution contacts comprises: assigning a first set of distribution contacts from remaining distribution contacts of the set of distribution contacts to the first cluster of distribution contacts and a second set of distribution contacts from the remaining distribution contacts to the second cluster of distribution contacts based on contact characteristics corresponding to the remaining distribution contacts.

Relatedly, in some embodiments, assigning the remaining distribution contacts from the set of distribution contacts to the clusters of distribution contacts comprises: mapping a first set of contact characteristics for a first set of remaining distribution contacts to contact characteristics of a representative distribution contact (e.g., centroid) for a first cluster of distribution contacts; and mapping a second set of contact characteristics for a second set of remaining distribution contacts to contact characteristics of a representative distribution contact (e.g., centroid) for a second cluster of distribution contacts.

Similarly, in certain implementations, assigning the remaining distribution contacts from the set of distribution contacts to the clusters of distribution contacts comprises: assigning the first set of distribution contacts from the remaining distribution contacts to the first cluster of distribution contacts by mapping a set of contact characteristics for a set of remaining distribution contacts to contact characteristics of a representative distribution contact (e.g., centroid) for the first cluster of distribution contacts.

As further shown in FIG. 7, the acts 700 include an act 740 of identifying a common contact characteristic in a cluster of distribution contacts. In particular, in certain embodiments, the act 740 includes identifying a common contact characteristic in a cluster of distribution contacts from the clusters of distribution contacts.

For example, in certain implementations, identifying the common contact characteristic in the cluster of distribution contacts from the clusters of distribution contacts comprises: identifying a first common contact characteristic from the first cluster of distribution contacts and a second common contact characteristic from the second cluster of distribution contacts.

Relatedly, in some cases, identifying the common contact characteristic in the cluster of distribution contacts from the clusters of distribution contacts comprises: computing a first distribution of the common contact characteristic from the cluster of distribution contacts; computing a second distribution of the common contact characteristic from the set of distribution contacts; and determining that a difference between the first distribution of the common contact characteristic and the second distribution of the common contact characteristic satisfies a commonality threshold.

As further shown in FIG. 7, the acts 700 include an act 750 of providing the cluster of distribution contacts and the common contact characteristic for display via a graphical user interface. For example, in some embodiments, providing the cluster of distribution contacts and the common contact characteristic for display via the graphical user interface comprises providing a cluster visualization identifying the cluster of distribution contacts and the common contact characteristic for presentation in a clustering user interface of the client device.

Relatedly, in certain implementations, providing the cluster of distribution contacts and the common contact characteristic for display via the graphical user interface comprises providing for display within a clustering user interface a first cluster visualization for the first cluster of distribution contacts identifying the first common contact characteristic and a second cluster visualization for the second cluster of distribution contacts identifying the second common contact characteristic.

In addition to the acts 710-750, in certain implementations, the acts 700 further include identifying user input from a client device requesting a cluster analysis of the set of distribution contacts; and based on the user input requesting the cluster analysis, providing a cluster visualization identifying the cluster of distribution contacts and the common contact characteristic for presentation in the graphical user interface of the client device. In some embodiments, providing the cluster visualization comprises generating a first visual indicator comprising a quantity of distribution contacts from the cluster of distribution contacts corresponding to the common contact characteristic; and generating a second visual indicator reflecting an additional contact characteristic in the cluster of distribution contacts.

Similarly, in certain implementations, the acts 700 further include identifying user input from a client device requesting a cluster analysis of the set of distribution contacts; and based on the user input requesting the cluster analysis, providing for display within the clustering user interface of the client device the first cluster visualization for the first cluster of distribution contacts and the second cluster visualization for the second cluster of distribution contacts.

Relatedly, in some cases, identifying the user input requesting the cluster analysis of the set of distribution contacts comprises: receiving an indication of a first user selection of the set of distribution contacts; and receiving an indication of a second user selection of contact-characteristic categories corresponding to the subset of contact characteristics. In some such embodiments, the contact-characteristic categories corresponding to the subset of contact characteristics comprise at least one of: click-through rate, company, company size, country, distribution-contact score, industry, job title, job function, maturity, open rate, revenue, state, or website visits.

As suggested above, in some embodiments, the acts 700 further include receiving an indication of a user selection of the cluster of distribution contacts; and based on the user selection of the cluster of distribution contacts, distributing digital content from a digital content campaign to computing devices corresponding to the cluster of distribution contacts. Similarly, in certain implementations, the acts 700 further include receiving an indication of a first user selection of a first digital content campaign for the first cluster of distribution contacts and an indication of a second user selection of a second digital content campaign for the second cluster of distribution contacts; and based on the first and second user selections, distributing digital content from the first digital content campaign to computing devices corresponding to the first cluster of distribution contacts and digital content from the second digital content campaign to computing devices corresponding to the second cluster of distribution contacts.

In addition (or in the alternative) to the acts describe above, in some embodiments, the acts 700 include a step for grouping the set of distribution contacts in a plurality of clusters generated from a subset of distribution contacts. For instance, the algorithms and acts described in relation to FIGS. 3A and 3B can comprise the corresponding acts for performing a step for grouping the set of distribution contacts in a plurality of clusters generated from a subset of distribution contacts.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 8:
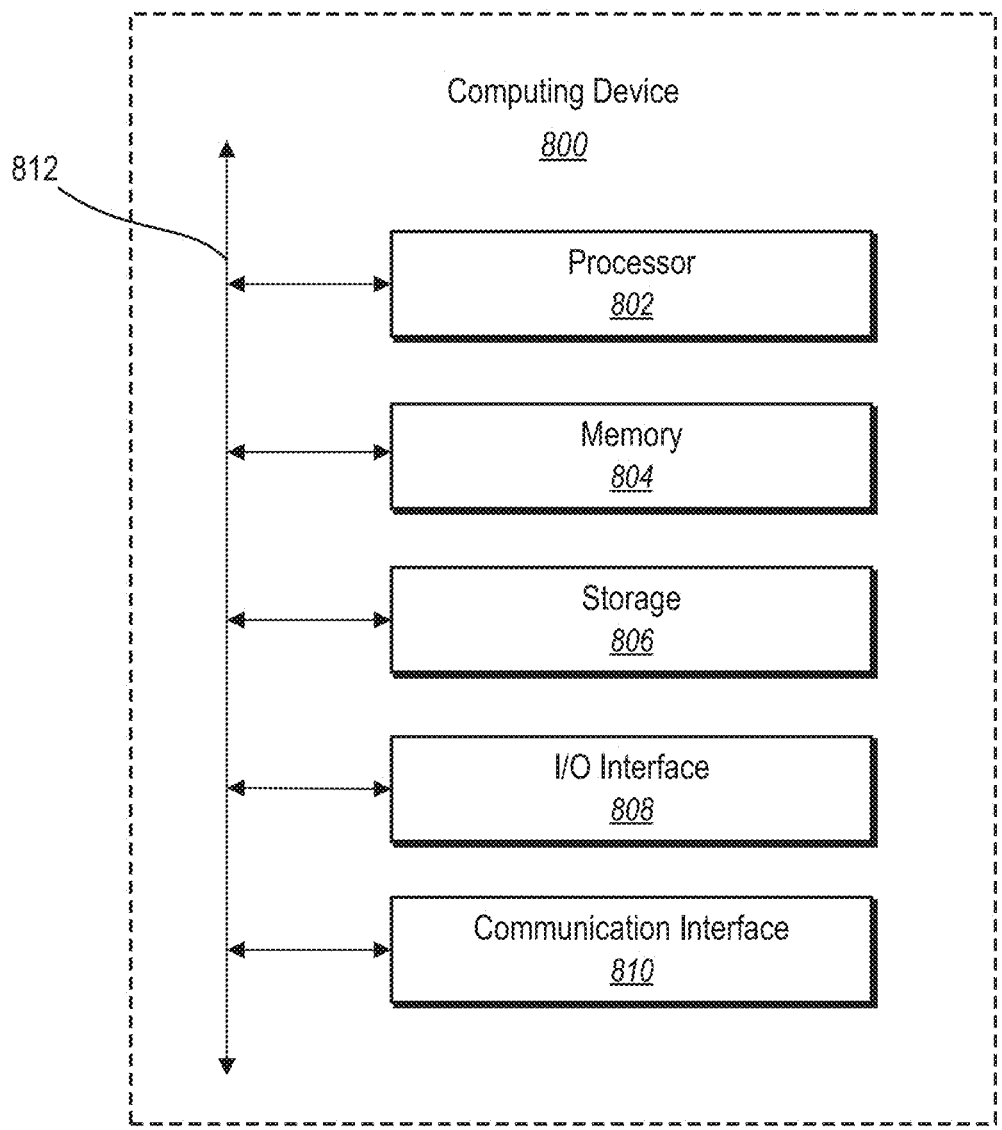
FIG. 8 illustrates a block diagram of an exemplary computing device for implementing one or more embodiments of the present disclosure.

FIG. 8 illustrates a block diagram of exemplary computing device 800 that may be configured to perform one or more of the processes described above. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example, and not by way of limitation, to execute instructions for digitizing real-world objects, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions related to object digitizing processes (e.g., digital scans, digital models).

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A computer-implemented method comprising:
    sampling a subset of distribution contacts and a corresponding subset of contact characteristics from a distribution dataset comprising a set of distribution contacts;
    generating clusters of distribution contacts from the subset of distribution contacts based on a clustering algorithm and the subset of contact characteristics;
    identifying, from the clusters of distribution contacts, a set of representative distribution contacts comprising a representative distribution contact for each cluster of distribution of contacts;
    assigning remaining distribution contacts from the set of distribution contacts to the clusters of distribution contacts by mapping contact characteristics for the remaining distribution contacts to contact characteristics for the set of representative distribution contacts from the clusters of distribution contacts, wherein mapping the contact characteristics differs from the clustering algorithm;
    identifying a common contact characteristic in a cluster of distribution contacts from the clusters of distribution contacts based on differing distributions of the common contact characteristic between the cluster of distribution contacts and the set of distribution contacts; and
    providing a cluster visualization for the cluster of distribution contacts and a visual representation of the common contact characteristic for display via a graphical user interface.

2. The computer-implemented method of claim 1, wherein mapping the contact characteristics for the remaining distribution contacts to the contact characteristics for the set of representative distribution contacts from the clusters of distribution contacts comprises:
    mapping a first set of contact characteristics for a first set of remaining distribution contacts to contact characteristics of a first representative distribution contact for a first cluster of distribution contacts; and
    mapping a second set of contact characteristics for a second set of remaining distribution contacts to contact characteristics of a second representative distribution contact for a second cluster of distribution contacts.

3. The computer-implemented method of claim 1, further comprising:
    identifying a selected contact characteristic in the cluster of distribution contacts;
    providing the visual representation of the common contact characteristic by providing, for display via the graphical user interface, a first visual representation of a first portion of distribution contacts from the cluster of the distribution contacts that exhibit the common contact characteristic; and
    providing, for display via the graphical user interface, a second visual representation of a second portion of distribution contacts from the cluster of the distribution contacts that exhibit the selected contact characteristic.

4. The computer-implemented method of claim 1, further comprising:
    identifying an additional common contact characteristic in the cluster of distribution contacts based on differing distributions of the additional common contact characteristic between the cluster of distribution contacts and the set of distribution contacts; and
    wherein providing the cluster visualization for the cluster of distribution contacts and the visual representation of the common contact characteristic comprises providing, for display via the graphical user interface, the cluster visualization comprising:
        the visual representation of the common contact characteristic; and
        an additional visual representation of the additional common contact characteristic.

5. A non-transitory computer readable medium storing instructions thereon that, when executed by at least one processor, cause a computing device to:
    sample a subset of distribution contacts and a corresponding subset of contact characteristics from a distribution dataset comprising a set of distribution contacts;
    generate clusters of distribution contacts from the subset of distribution contacts based on a clustering algorithm and the subset of contact characteristics;
    identify, from the clusters of distribution contacts, a set of representative distribution contacts comprising a representative distribution contact for each cluster of distribution of contacts;
    assign remaining distribution contacts from the set of distribution contacts to the clusters of distribution contacts by mapping contact characteristics for the remaining distribution contacts to contact characteristics for the set of representative distribution contacts from the clusters of distribution contacts, wherein mapping the contact characteristics differs from the clustering algorithm;
    identify a common contact characteristic in a cluster of distribution contacts from the clusters of distribution contacts based on differing distributions of the common contact characteristic between the cluster of distribution contacts and the set of distribution contacts; and
    provide a cluster visualization for the cluster of distribution contacts and a visual representation of the common contact characteristic for display via a graphical user interface.

6. The non-transitory computer readable medium of claim 5, further comprising instructions that, when executed by the at least one processor, cause the computing device to:
    identify user input from a client device requesting a cluster analysis of the set of distribution contacts; and
    based on the user input requesting the cluster analysis, provide the cluster visualization for the cluster of distribution contacts and the visual representation of the common contact characteristic for presentation via the graphical user interface of the client device.

7. The non-transitory computer readable medium of claim 6, further comprising instructions that, when executed by the at least one processor, cause the computing device to:
    provide the cluster visualization by generating a visual indicator comprising a quantity of distribution contacts from the cluster of distribution contacts corresponding to the common contact characteristic; and
    provide the visual representation of the common contact characteristic by generating a first visual representation of the common contact characteristic and a second visual representation of an additional common contact characteristic in the cluster of distribution contacts.

8. The non-transitory computer readable medium of claim 6, further comprising instructions that, when executed by the at least one processor, cause the computing device to identify the user input requesting the cluster analysis of the set of distribution contacts by:
receiving an indication of a first user selection of the set of distribution contacts; and
receiving an indication of a second user selection of contact-characteristic categories corresponding to the subset of contact characteristics.

9. The non-transitory computer readable medium of claim 5, further comprising instructions that, when executed by the at least one processor, cause the computing device to generate the clusters of distribution contacts from the subset of distribution contacts by applying a Mini-Batch-K-Means-clustering algorithm to the subset of distribution contacts and the subset of contact characteristics.

10. The non-transitory computer readable medium of claim 5, further comprising instructions that, when executed by the at least one processor, cause the computing device to map the contact characteristics for the remaining distribution contacts to the contact characteristics for the set of representative distribution contacts from the clusters of distribution contacts by:
mapping a first set of contact characteristics for a first set of remaining distribution contacts to contact characteristics of a first representative distribution contact for a first cluster of distribution contacts; and
mapping a second set of contact characteristics for a second set of remaining distribution contacts to contact characteristics of a second representative distribution contact for a second cluster of distribution contacts.

11. The non-transitory computer readable medium of claim 5, further comprising instructions that, when executed by the at least one processor, cause the computing device to identify the common contact characteristic in the cluster of distribution contacts from the clusters of distribution contacts based on differing distributions of the common contact characteristic between the cluster of distribution contacts and the set of distribution contacts by:
computing a first distribution of the common contact characteristic from the cluster of distribution contacts;
computing a second distribution of the common contact characteristic from the set of distribution contacts; and
determining that a difference between the first distribution of the common contact characteristic and the second distribution of the common contact characteristic satisfies a commonality threshold.

12. The non-transitory computer readable medium of claim 5, further comprising instructions that, when executed by the at least one processor, cause the computing device to:
receive an indication of a user selection of the cluster of distribution contacts; and
based on the user selection of the cluster of distribution contacts, distribute digital content from a digital content campaign to computing devices corresponding to the cluster of distribution contacts.

13. A system comprising:
at least one processor; and
at least one non-transitory computer readable medium comprising: a distribution dataset comprising a set of distribution contacts and corresponding contact characteristics, and instructions that, when executed by the at least one processor, cause the system to:
sample a subset of distribution contacts and a corresponding subset of contact characteristics from the distribution dataset;
utilize a clustering algorithm to generate a first cluster of distribution contacts and a second cluster of distribution contacts from the subset of distribution contacts based on the subset of contact characteristics;
identify a first representative distribution contact from the first cluster of distribution contacts and a second representative distribution contact from the second cluster of distribution contacts;
assign a first set of distribution contacts from remaining distribution contacts of the set of distribution contacts to the first cluster of distribution contacts by mapping contact characteristics for a first subset of the remaining distribution contacts to contact characteristics for the first representative distribution contact from the first cluster of distribution contacts;
assign a second set of distribution contacts from the remaining distribution contacts to the second cluster of distribution contacts by mapping contact characteristics for a second subset of the remaining distribution contacts to contact characteristics for the second representative distribution contact from the second cluster of distribution contacts, wherein mapping the contact characteristics for the first and second clusters of distribution contacts differs from the clustering algorithm;
identify a first common contact characteristic from the first cluster of distribution contacts and a second common contact characteristic from the second cluster of distribution contacts; and
provide, for display within a clustering user interface, a first cluster visualization for the first cluster of distribution contacts comprising a first visual representation of the first common contact characteristic and a second cluster visualization for the second cluster of distribution contacts comprising a second visual representation of the second common contact characteristic.

14. The system of claim 13, further comprising instructions that, when executed by the at least one processor, cause the system to:
identify user input from a client device requesting a cluster analysis of the set of distribution contacts; and
based on the user input requesting the cluster analysis, provide, for display within the clustering user interface of the client device, the first cluster visualization for the first cluster of distribution contacts and the second cluster visualization for the second cluster of distribution contacts.

15. The system of claim 14, further comprising instructions that, when executed by the at least one processor, cause the system to identify the user input requesting the cluster analysis of the set of distribution contacts by:
receiving an indication of a first user selection of the set of distribution contacts; and
receiving an indication of a second user selection of contact-characteristic categories corresponding to the subset of contact characteristics.

16. The system of claim 15, wherein the contact-characteristic categories corresponding to the subset of contact characteristics comprise at least one of: click-through rate, company, company size, country, distribution-contact score, industry, job title, job function, maturity, open rate, revenue, state, or website visits.

17. The system of claim 13, further comprising instructions that, when executed by the at least one processor, cause the system to provide, for display within the clustering user interface, the first cluster visualization by:
- generating a visual indicator comprising a quantity of distribution contacts from the first cluster of distribution contacts corresponding to the first common contact characteristic; and
- generating a contact-characteristic indicator comprising an additional visual representation of an additional contact characteristic in the first cluster of distribution contacts selected by a user or by the system.

18. The system of claim 13, further comprising instructions that, when executed by the at least one processor, cause the system to identify the first representative distribution contact from the first cluster of distribution contacts by identifying a centroid for the first cluster of distribution contacts.

19. The system of claim 13, further comprising instructions that, when executed by the at least one processor, cause the system to identify the first common contact characteristic from the first cluster of distribution contacts by:
- computing a first distribution of the first common contact characteristic from the first cluster of distribution contacts;
- computing a second distribution of the first common contact characteristic from the set of distribution contacts; and
- determining that a difference between the first distribution of the first common contact characteristic and the second distribution of the first common contact characteristic satisfies a commonality threshold.

20. The system of claim 13, further comprising instructions that, when executed by the at least one processor, cause the system to:
- receive an indication of a first user selection of a first digital content campaign for the first cluster of distribution contacts and an indication of a second user selection of a second digital content campaign for the second cluster of distribution contacts; and
- based on the first and second user selections, distribute digital content from the first digital content campaign to computing devices corresponding to the first cluster of distribution contacts and digital content from the second digital content campaign to computing devices corresponding to the second cluster of distribution contacts.

* * * * *